United States Patent [19]
Babcock et al.

[11] Patent Number: 5,623,519
[45] Date of Patent: Apr. 22, 1997

[54] APPARATUS FOR COMPARING THE WEIGHT OF A BINARY WORD TO A NUMBER

[75] Inventors: Mark H. Babcock, Austin, Tex.; James A. Lamb, Coral Springs, Fla.

[73] Assignee: Motorola, Inc., Schaumburg, Ill.

[21] Appl. No.: 591,191

[22] Filed: Dec. 28, 1995

Related U.S. Application Data

[63] Continuation of Ser. No. 161,848, Dec. 6, 1993, abandoned.

[51] Int. Cl.$^6$ .................................................. H04L 27/06
[52] U.S. Cl. ...................... 375/316; 375/340; 340/825.79
[58] Field of Search .................................. 375/369, 365, 375/340, 342, 343, 368, 316; 340/825.87, 825.79, 825.91, 146.2

[56] References Cited

U.S. PATENT DOCUMENTS

| | | | |
|---|---|---|---|
| 3,490,000 | 1/1970 | Dawson | 340/146.2 |
| 4,414,676 | 11/1983 | Kraul et al. | 375/368 |
| 5,175,860 | 12/1992 | Yamada | 340/146.2 |
| 5,349,611 | 9/1994 | Varian | 370/107 |
| 5,357,235 | 10/1994 | McClure | 340/146.2 |
| 5,381,126 | 1/1995 | McClure | 340/146.2 |
| 5,392,289 | 2/1995 | Varian | 375/368 |

OTHER PUBLICATIONS

Carver A. Mead, "Introduction to VLSI Systems", Oct. 1980, pp. 78–80 & 374.
Samuel H. Caldwell, "Switching Circuits and Logical Design", Feb. 1967, pp. 236–271 & 414–449.
Jacob Millman, Ph. D. "Microelectronics Digital and Analog Circuit System" McGraw Hill, 1979, pp. 186–199.

Primary Examiner—Tesfaldet Bocure
Attorney, Agent, or Firm—James A. Lamb

[57] ABSTRACT

A logic circuit (260) includes recursive elements (470, 1070, 1400, 1600) interconnected in a matrix (300), and M data inputs (490), and a logic circuit output (475). In one embodiment, N+1 binary column setup inputs (485), and M–N binary row setup inputs (480) are also included. The matrix (300) is an arrangement of the recursive elements (470) in rows, columns, and diagonals. The M data inputs (490) are for coupling the M bits of the binary word to the recursive elements (470). The logic circuit output (475) includes an output (810) of one of the recursive elements (470, 1070, 1400, 1600). The logic circuit output (475) has a binary value determined by a comparison of the number of bits having a first binary value within the binary word, to the predetermined number, N. In the one embodiment, the comparison is determined by the values of the setup inputs (480), (485).

27 Claims, 15 Drawing Sheets

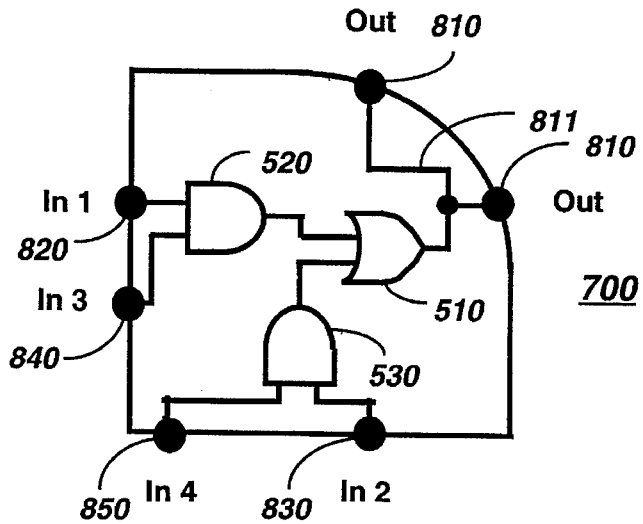
FIG. 5
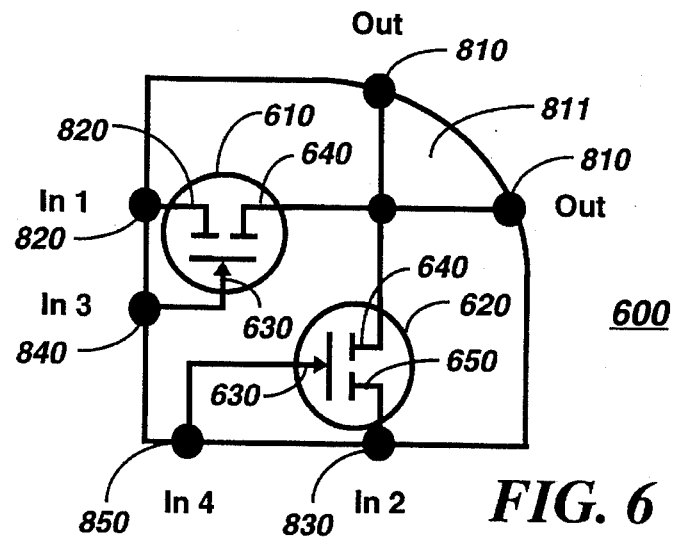
FIG. 7
FIG. 6
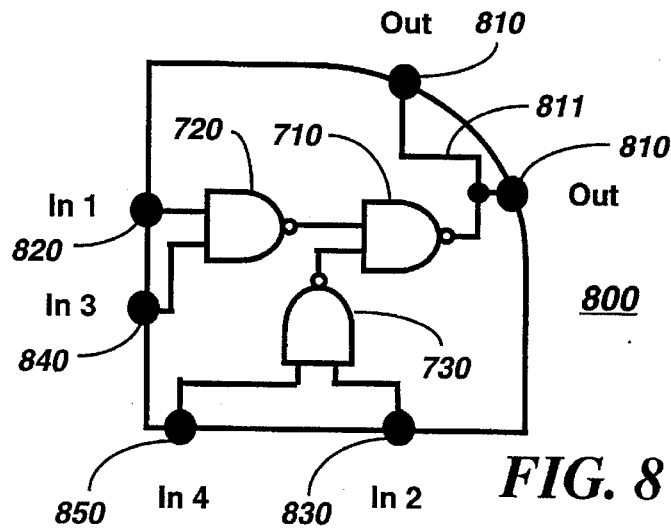
FIG. 8

5,623,519

APPARATUS FOR COMPARING THE WEIGHT OF A BINARY WORD TO A NUMBER

This is a file wrapper continuation of application Ser. No. 08/161,848, filed Dec. 6, 1993, now abandoned.

FIELD OF THE INVENTION

This invention relates in general to electronic circuits and in particular to an electronic circuit for comparing the quantity of ones or zeroes in a binary word to a predetermined number.

BACKGROUND OF THE INVENTION

A known means of establishing frame and word synchronization in serial data transmission is to use one, or perhaps a few, binary synchronization word patterns at the beginning of a serial data message. By careful choice of word patterns, the synchronization word patterns are typically resistant to noise falsing while also offering better probability of detection than portions of message contents which follow. Multiple patterns are used to indicate fundamental information about the signal which follows, such as the data rate. This is often accomplished by using pairs of synchronization words which are the binary inverse of each other. In the serial data receiver, such as a portable selective call receiver, the correct synchronization pattern or patterns are then compared to each successive received bit pattern of the same length as the synchronization word, and synchronization is detected when the mismatch between a correct synchronization pattern and a successive received bit pattern is less than a predetermined number of bits. For example, a 32 bit long synchronization word may be used, with the predetermined number of mismatched errors being three, thereby allowing synchronization detection with up to two bit errors.

The same detection process is also used with other data words wherein the data word contents are predetermined in each receiver, such as a serial data receiver identification word. The length of the word is made long enough to permit the selection of an error code which provides sufficient Hamming distance between all the predetermined identification numbers used within a system, such as in a POCSAG (Post Office Code Standard Advisory Group) system, thereby avoiding false identification responses even in the presence of errors.

A known means of such synchronization detection, which has been used successfully, is to use a correlation method in a microprocessor which first performs a binary Exclusive Or operation, on a bit by bit basis, of the bits of each successive received bit pattern with a stored correct synchronization pattern, generating a comparison word from the bits resulting from the Exclusive Or operation, determining the number of ones (mismatching bits) in the comparison word, which is a representation of the weight of the word, and comparing the weight to the predetermined number of mismatched bits. When the inverse pattern is also used, the weight of the inverse pattern, which can be determined from the weight of the pattern, is also compared to the predetermined number of mismatched bits. Because the synchronization word is often longer than the data length of the microprocessor (e.g., 32 bits versus 8 bits), the method often requires a large number of instructions to be performed.

Another means of performing the weight measurement necessary for correlation detection is to use a straightforward combinatorial logic circuit which has an AND function for each allowable comparison word. For example, in the case where the synchronization word is 32 bits long and where up to two errors are allowed, there are 529 different allowable words, resulting in the equivalent of 529 thirty two bit AND gates, thus making this approach impractical due to the number of gates involved to realize such a circuit.

As serial data rates increase, the method of using a microprocessor to detect correlation requires faster and more powerful microprocessors. In portable electronic devices that use serial data communications, the detection of the synchronization word may require the use of a higher current drain or more expensive microprocessor than what would otherwise be needed in the portable electronic devices.

Thus, what is needed is a fast, cost effective, low power means to detect the synchronization word.

SUMMARY OF THE INVENTION

Accordingly, in a first aspect of the present invention, an apparatus is a logic circuit including (N+1)*(M−N) recursive elements interconnected in a matrix, M data inputs, M inverted data inputs, N+1 binary column setup inputs, M−N binary row setup inputs, and a logic circuit output. M is a positive non-zero integer and N is an integer greater than or equal to zero and less than or equal to M−1. The apparatus is for making a comparison of the number of bits having a first binary value within a binary word of M bits to a predetermined number, N, wherein each of the bits of the binary word has a first or a second binary value. The matrix is an arrangement of the recursive elements in rows, columns, and diagonals. The M data inputs are for coupling the M bits of the binary word to the recursive elements. The M inverted data inputs are for coupling inverted values of the M bits of the binary word to the recursive elements. The N+1 binary column setup inputs are coupled to one column of the recursive elements. The M−N binary row setup inputs are coupled to one row of the recursive elements. The logic circuit output includes an output of one the recursive elements. The logic circuit output has a binary value determined by a comparison of the number of bits having a first binary value within the binary word, to the predetermined number, N, the comparison being determined by the vlues of the binary row and column setup inputs.

In a second aspect of the present invention, an apparatus is a logic circuit including (N+1)*(M−N−1) first recursive elements and (N+1) second recursive elements interconnected in a matrix, M data inputs, M inverted data inputs, M−N first binary values, and a logic circuit output. The apparatus is for making a comparison of the number of bits having a first binary value within a binary word of M bits to a predetermined number, N, wherein each of the bits of the binary word has a first or a second binary value. M is a positive non-zero integer and N is an integer greater than or equal to zero and less than M−1. The matrix is an arrangement of the first recursive elements and second recursive elements in rows, columns, and diagonals. the M data inputs are for coupling the M bits of the binary word to the first recursive elements and the second recursive elements. The M inverted data inputs are for coupling inverted values of the M bits of the binary word to the first recursive elements and the second recursive elements. The M−N first binary values are coupled to the recursive elements of one row of the first and second recursive elements. The logic circuit output includes an output of one of the first recursive elements, the output having a binary value determined by a comparison of the number of bits having a first binary value within the bnary word, to the predetermined number N.

In a third aspect of the present invention, an apparatus is a logic circuit including a coupling of (N+1)*(M−1)−(N*(N+1)/2) recursive elements interconnected in a matrix, M data inputs, and a first logic circuit output. The apparatus is for making a comparison of the number of bits having a first binary value within a binary word of M bits to a predetermined number N, wherein each of the M bits has a first or a second binary value. The matrix is an arrangement of the recursive elements in rows, and columns. The M data inputs are for coupling the M bits of the binary word to (N)*(M−1)−(N−1)*N/2) of the recursive elements. The first logic circuit output includes a first output of one of the recursive elements, the first logic circuit output having a binary value determined by comparison of the number of bits having a first binary value within the binary word, to the predetermined number (N). The matrix is an arrangement of the recursive elements organized in N+1 rows, and M−1 columns of the recursive elements. Each row is identified by a row number i, i being an integer from 1 to N+1, and each column being identified by a column number j, j being an integer from 1 to M−1. Each of the recursive elements is identified by a unique one of (N+1)*(M−1)−(N*((N+1)/2) row and column couplets (i,j). A first input of each of the recursive elements (i,j), i=2 to N+1 and j=i to M−1, is coupled to a second output of the recursive element (i−1,j). A second input of each of the recursive elements (i,j), i=1 to N+1 and j=i+1 to M−1, is coupled to a first output of the recursive element (i,j−1). A second input of each of the recursive elements (i,j), i=2 to N+1 and j=i, is coupled to a second output of the recursive element (i−1,j−1). Each of the recursive elements includes two two-input logic gates.

In a fourth aspect of the present invention, an apparatus is a logic circuit including a coupling of N*(M−1)−((N+1)*N/2) first recursive elements and M−N−1 second recursive elements interconnected in a matrix, M data inputs, and a first logic circuit output. The apparatus is for making a comparison of the number of bits having a first binary value within a binary word of M bits to a predetermined number, N, wherein each of the M bits has a first or a second binary value. The matrix is an arrangement of the first and second recursive elements in rows, and columns. M is greater than 2 and N is a positive non-zero integer less than or equal to M−1. The M data inputs are for coupling the M bits of the binary word to the first recursive elements. The first logic circuit output includes a first output of one of the first and second recursive elements, the first logic circuit output having a binary value determined by a comparison of the number of bits having a first binary value within the binary word, to the predetermined number N.

In a fifth aspect of the present invention, a communication receiver includes a receiver for recovering a signal having data words and message information, a controller coupled to the receiver for controlling the communication receiver and for storing a reference word having M bits, a correlation means coupled to the receiver for accepting the data words, and an alert device. The receiver generates data words having bits. The correlation means is coupled to the receiver for accepting the data words, and coupled to the controller for accepting the reference word. The correlation means includes of a comparison means and a weight detector means.

The comparison means is for comparing the bits of the data words coupled from the receiver to the bits of the reference word coupled from the controller, generating a comparison word including M bits representing the results of the comparison. A first quantity of the M bits of the comparison word having a first binary value represent a mismatch.

The weight detector is a logic circuit including (N+1)*(M−N) recursive elements interconnected in a matrix, M data inputs, M inverted data inputs, N+1 binary column setup inputs, M−N binary row setup inputs, and a correlation output. M is a positive noon-zero integer and N is an integer greater than or equal to zero and less than or equal to M−1. The weight detector is for making a comparison of the first quantity of the M bits to a predetermined number, N. The matrix is an arrangement of the recursive elements in rows, columns, and diagonals. The M data inputs are for coupling the M bits of the binary word to the recursive elements. The M inverted data inputs are for coupling inverted values of the M bits of the binary word to the recursive elements. The N+1 binary column setup inputs are coupled to one column of the recursive elements. The M−N binary row setup inputs are coupled to one row of the recursive elements. The correlation output is an output of one of the recursive elements. The correlation output has a binary value determined by a comparison of the first quantity of the M bits to the predetermined number, N, the comparison being determined by the values of the binary row and column setup inputs.

The controller is further coupled to the correlation means for processing the message coupled from the receiver and for generating an alert activation command in response to the correlation output. The alert device is coupled to the controller for presenting an alert signal in response to the alert activation command.

A sixth aspect of the present invention is a communication receiver which includes a receiver for recovering a signal having data words and message information, a controller coupled to the reciver for controlling the communication receiver and for storing a reference word having M bits, a correlation means coupled to the receiver for accepting the data words, and an alert device. The receiver generates data words having bits. The correlation means is coupled to the receiver for accepting the data words, and coupled to the controller for accepting the reference word. The correlation means includes a comparison means and a weight detector means.

The comparison means is for comparing the bits of the data words coupled from the receiver to the bits of the reference word coupled from the controller, generating a comparison word including M bits representing the results of the comparison. A first quantity of the M bits of the comparison word, which have a first binary value, represent a mismatch.

The weight detector is a logic circuit including a coupling of N*(M−1)−((N+1)*N/2) first recursive elements and M−N−1 second recursive elements interconnected in a matrix, M data inputs, and a correlation output. The weight detector is for making a comparison of the first quantity of the M bits to a predetermined number, N. The matrix is an arrangement of the first and second recursive elements in rows, and columns. M is greater than 2 and N is a positive non-zero integer less than or equal to M−1. The M data input are for coupling the M bits of the comparison word to the first recursive elements. The correlation output includes a first output of one of the first and second recursive elements. The correlation output has a binary value determined by a comparison of the first quantity of the M bits to the predetermined number N.

The controller is further coupled to the correlation means for processing the message coupled from the receiver and for generating an alert activation command in response to the correlation output. The alert device is coupled to the controller for presenting an alert signal in response to the alert activation command.

The fourth embodiment of the present invention is incorporated in a communication receiver which includes a receiver for recovering a signal having data words and message information, a controller coupled to the receiver for controlling the communication receiver and for storing a reference word having M bits, a correlation means coupled to the receiver for accepting the data words, and an alert device. The receiver generates data words having bits. The correlation means is coupled to the receiver for accepting the data words, and coupled to the controller for accepting the reference word. The correlation means includes a comparison means and a weight detector means.

The comparison means is for comparing the bits of the data words coupled from the receiver to the bits of the reference word coupled from the controller, generating a comparison word including M bits representing the results of the comparison, wherein bits of the comparison word having a first binary value represent a mismatch and bits of the comparison word having a second binary value represent a match.

The weight detector is a logic circuit including a coupling of $N*(M-1)-((N+1)*N/2)$ first recursive elements and $M-N-1$ second recursive elements interconnected in a matrix, M data inputs, and a correlation output. The weight detector is for making a comparison of the number of bits having a first binary value within the comparison word of M bits to a predetermined number, N, wherein each of the M bits has a first or a second binary value. The matrix is an arrangement of the first and second recursive elements in rows, and columns. The M data inputs are for coupling the M bits of the comparison word to the first recursive elements. The correlation output includes a first output of one of the first and second recursive elements, the correlation output having a binary value determined by a comparison of the number of bits having a first binary value within the comparison word, to the predetermined number N.

The controller is further coupled to the correlation means for processing the message coupled from the receiver and for generating an alert activation command in response to the correlation output. The alert device is coupled to the controller for presenting an alert signal in response to the alert activation command. dr

BRIEF DESCRIPTION OF THE DRAWING

FIG. 5 is a symbol used to represent recursive elements suitable for use in the first and a second embodiment of the weight detector of the present invention.

FIG. 6, FIG. 7, and FIG. 8 are electrical circuit diagrams of recursive elements represented by the symbol of FIG. 5, suitable for use in the first and second embodiments of the weight detector of the present invention.

DETAILED DESCRIPTION OF THE INVENTION

Figure 1:
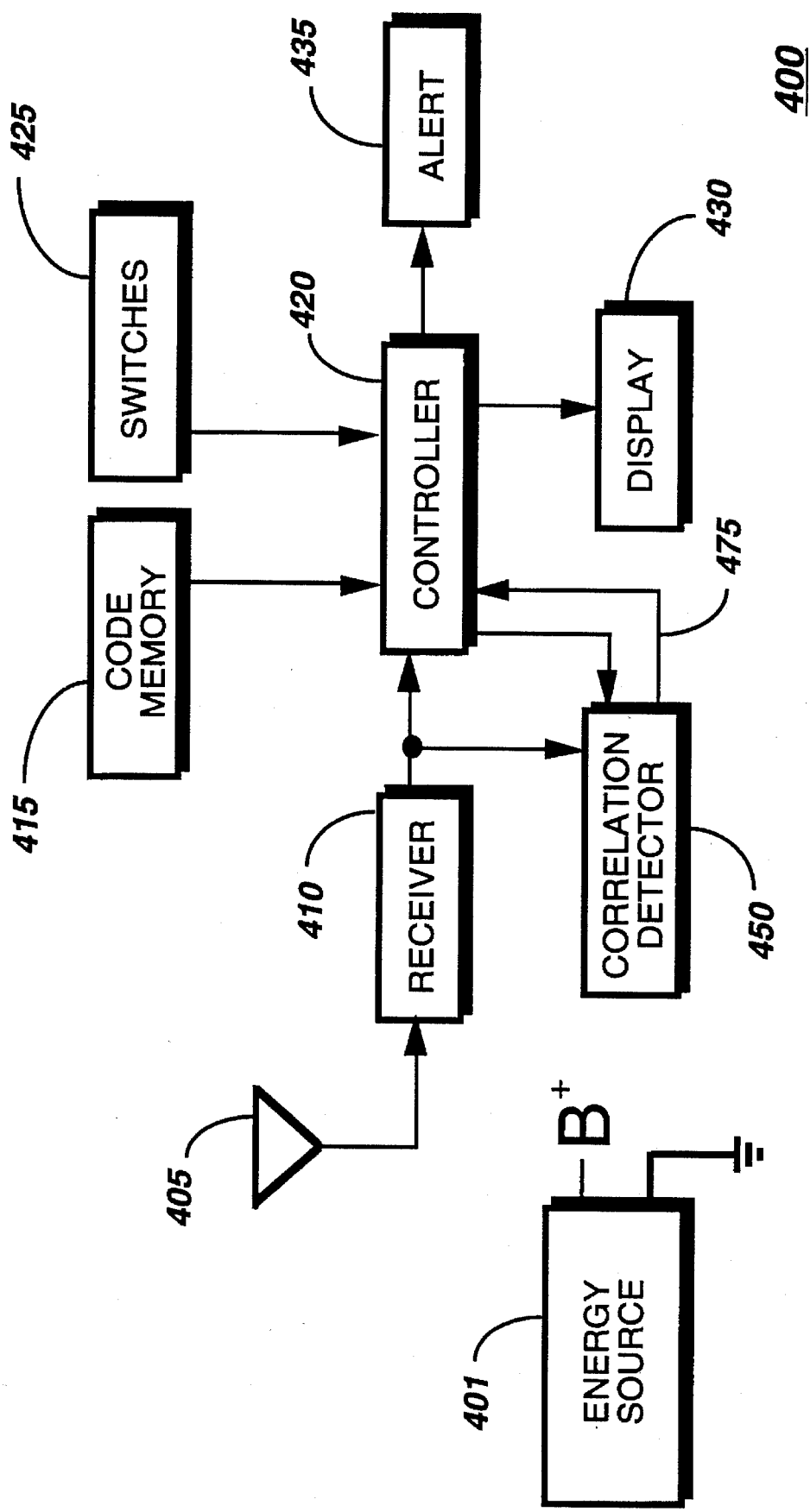
FIG. 1 is an electrical block diagram of a selective call device in accordance with the preferred embodiment of the present invention.

Referring to FIG. 1, an electrical block diagram of a selective call device 400 is shown which is suitable for use in accordance with the preferred embodiment of the present invention to be described below. The selective call device 400 includes an antenna 405 for receiving a radio signal. The received signal is a radio frequency (RF) modulated serial data signal, for example a POCSAG (Post Office Code Standard Advisory Group) paging signal, having synchronization information and encoded information, the encoded information comprising at least an address and a message which are organized in words and frames. The received signal is coupled from the antenna 405 to a receiver 410, wherein it is filtered, amplified, and demodulated, generating a demodulated signal which is coupled to a controller 420 and a correlation detector 450. A receive bit clock signal, a synchronization word, and a setup word are coupled from the controller 420 to the correlation detector 450, and a correlation detector output 475 is coupled from the correlation detector 450 to the controller 420. The correlation detector output 475 provides information which is used in the controller 420 to establish word and frame synchronization for the encoded information within the received signal. When word and frame synchronization is established, the information in the demodulated signal is processed by controller 420 to recover the address. The controller 420 compares the recovered address to a selective call address which is stored in a code memory 415 and which is coupled to the controller 420 from the code memory 415. When the recovered address and the selective call address do not match, the controller 420 ceases further processing of the demodulated information. When the decoded address and the selective call address match, the controller 420 continues processing the demodulated information to recover a decoded message. The controller 420 is coupled to a set of switches 425, to which the controller 420 is responsive for setting and controlling a plurality of operational modes of the selective call device 400. Depending on the operational mode of the selective call device 400, and depending on the contents of the recovered message, the controller 420 couples information to a display 430 for presentation, stores information for later presentation, and activates an alert device 435, for example, a tone alert device or a vibration alert device. The energy which powers the selective call device 400 is coupled to the code memory 415, the switches 425, a receiver 410, the controller 420, the alert device 435 the correlation detector 450, and the display 430 by means of a first supply voltage, which is a ground reference for the selective call device 400, and a second supply voltage, B+, coupled from an energy source 401. In the preferred embodiment of the present invention, the second supply voltage is more positive than the first supply voltage.

It will be appreciated that the correlation detector will, in some devices, also be used to provide an output to the controller based upon portions of the encoded information which can be compared to predetermined reference words. An example is when the address of the selective call device 400 is selected to have a Hamming distance sufficiently far from other addresses of selective call devices 400 so that when the received address mismatches a stored address with less than a predetermined number of errors, the message is further processed, as described above. In such instances, the coupling of the correlation detector 450 to the rest of the selective call device 400 is the same as described above.

The receiver 410 suitable for use in the preferred embodiment of the present invention in FIG. 1 is a receiver of a type well known to one of ordinary skill in the art. The code memory 415 is an EPROM, or SRAM or another memory type well known to one of ordinary skill in the art. The display 430 is preferably an LCD, although other display types can be used as well, and the antenna 405, switches 425, and alert device 435 are devices also well known to one of ordinary skill in the art. The controller in the preferred embodiment of the present invention is a microprocessor such as one of the 68HC05 family made by Motorola, Inc. of Schaumburg, Ill.

Figure 2:
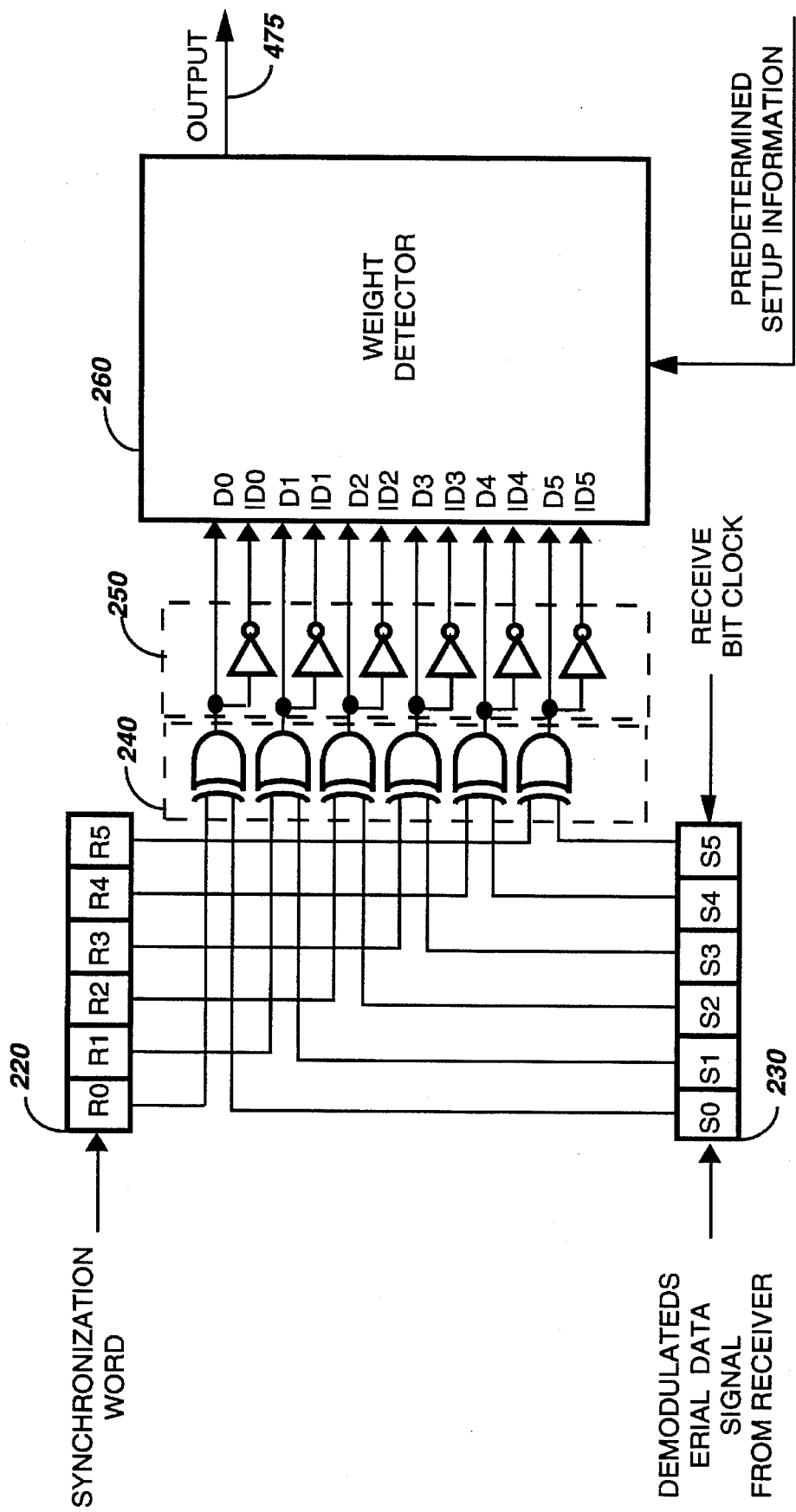
FIG. 2 is an electrical block diagram of a correlation detector used in the selective call device of FIG. 1 in accordance with the preferred embodiment of the present invention.

Referring to FIG. 2, an electrical block diagram of the correlation detector 450 suitable for use in the selective call device of FIG. 1 is shown in accordance with the preferred embodiment of the present invention. The correlation detector 450 shown is an example which, for simplicity, uses a word length of six bits for the demodulated serial data signal and the synchronization word. It will be appreciated that, for example, in a POCSAG signal, the synchronization information, or word, is 32 bits long. The synchronization word is loaded from the controller 420 into a reference word register 220, which is a parallel in, parallel out register, six bits long in this example. The synchronization word is one of one or more predetermined synchronization bit patterns stored in the controller 420, and transmitted in the radio signal which is received by the selective call device 400. The received signal may have errors which have been induced in the signal by the transmission medium. The demodulated serial data signal from the receiver 410 is coupled to a receive word register 230, which is a serial-in, parallel-out shift register, six bits long in this example, and where the demodulated serial data is shifted through the receive word register 230 by the receive bit clock signal coupled from the receiver 410. The bit values held in the outputs of the stages of the reference word register 220 and the receive word register 230 are compared on a basis of corresponding pairs of bits, one bit from each register, by a set of EXCLUSIVE OR gates 240, the set being six in this example. The outputs of the set of EXCLUSIVE OR gates 240 comprise a comparison word, having bit values identified as D0, D1, D2, through D(M–1), where M represents the number bits in the synchronization word, which in this example is six, which have a binary value of 1 when the compared bits are different and a value of 0 when they are the same. The outputs of the set of EXCLUSIVE OR gates 240 are coupled to a set of INVERTERs 250, six in this example, the outputs of which comprise an inverted comparison word, having bit values identified as ID0, ID1, ID2, through ID(M–1). The set of EXCLUSIVE OR gates 240, the receive word register 230, the reference word register 220 and the INVERTERs 250 are implemented with complementary metal oxide semiconductor transistor (CMOS) logic in the preferred embodiment of the present invention, but can be implemented with transistor transistor (TTL) logic, or other logic well known to one of ordinary skill in the art. In the embodiments of the weight detector of the present invention to be described below, a binary one is represented by a voltage substantially equal to the second (more positive) supply voltage, and a binary zero is represented by a voltage substantially near the first supply voltage. The comparison word and inverted comparison word are coupled to a weight detector 260. Using the setup information coupled from the controller 420, the comparison word of length M bits, and the inverted comparison word, the weight detector 260 compares the number of bits in the comparison word having a binary value 1, W1, or the number of bits in the comparison word having a binary value 0, W0, to a predetermined number, N, and generates the correlation detector output 475, comprising one or more binary values indicating the result of the comparison, to the controller 420. In the case of a weight detector for a POCSAG signal, correlation detection is typically designed to occur when the weight comparison word indicates fewer than three errors. It will be further appreciated that the complexity of the correlation detector 450 is substantially proportional to the product of the length of the synchronization word and the number of errors allowed.

It will be appreciated that the correlation detector 450 can also be used to provide an output to the controller 420 based upon portions of the encoded information which can be compared to predetermined reference words, instead of the synchronization information. An example is when the predetermined address of the selective call device 400 has been chosen to have a Hamming distance sufficiently far from predetermined addresses of other selective call devices 400 so that when the received address mismatches a stored address with less than a predetermined number of errors, the message is further processed as described above, with little probability of falsely accepting a message intended for another selective call device 400. For this purpose, the coupling of the correlation detector 450 to the rest of the selective call device 400 is the same as described above, however, the controller 420 couples the appropriate predetermined word to the reference word register 220, such as an address word, instead of the synchronization word discussed in the paragraph above in reference to FIG. 2.

It will be appreciated that the correlation detector 450 described in accordance with the preferred embodiment of the present invention is usable in any radio communication receiving device using digital codes that can be reduced to binary codes for making a correlation determination.

Figure 3:
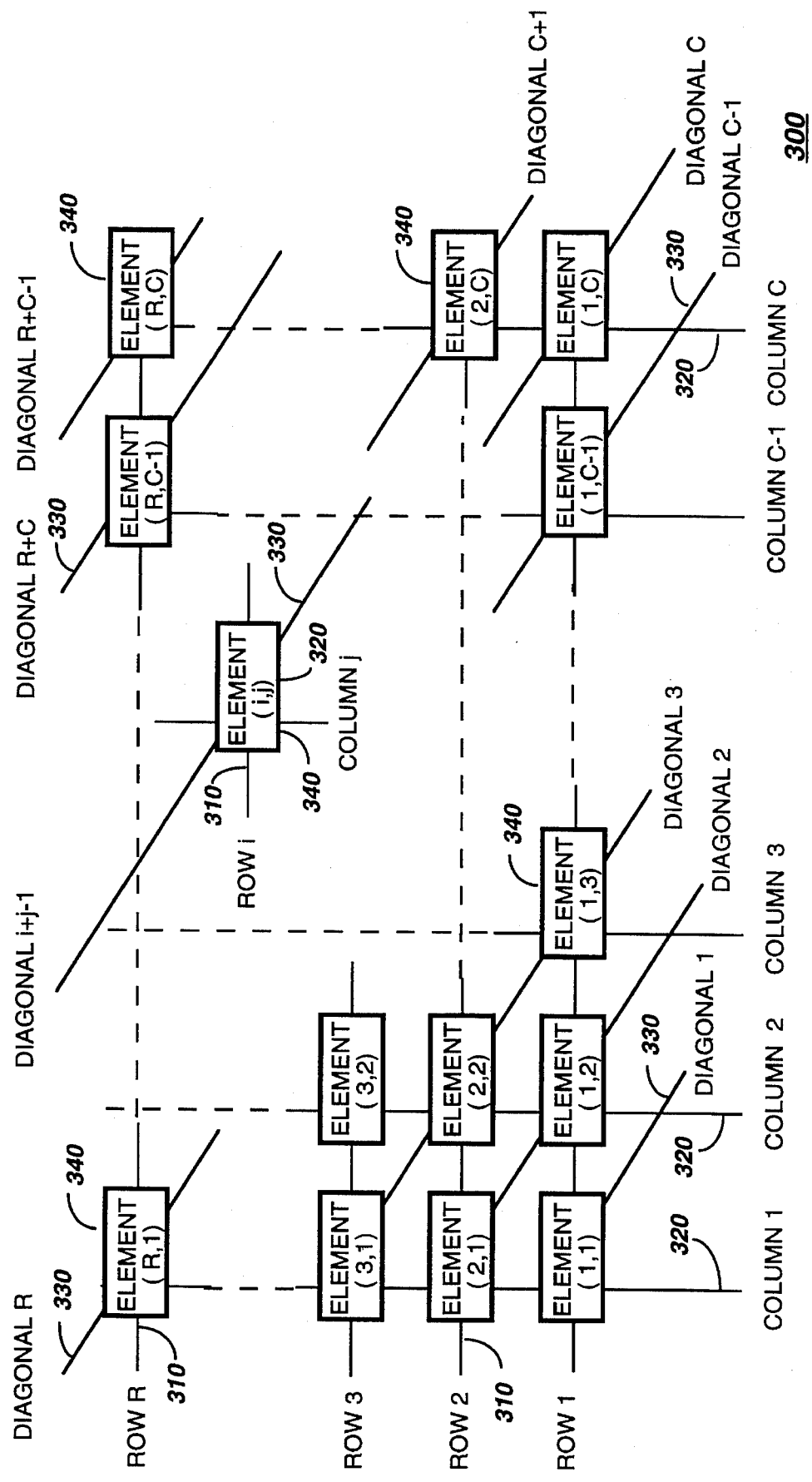
FIG. 3 is a diagram of a matrix arrangement of recursive circuit elements used to implement a weight detector as used in the correlation detector of FIG. 2, in accordance with the preferred embodiment of the present invention.
Figure 4:
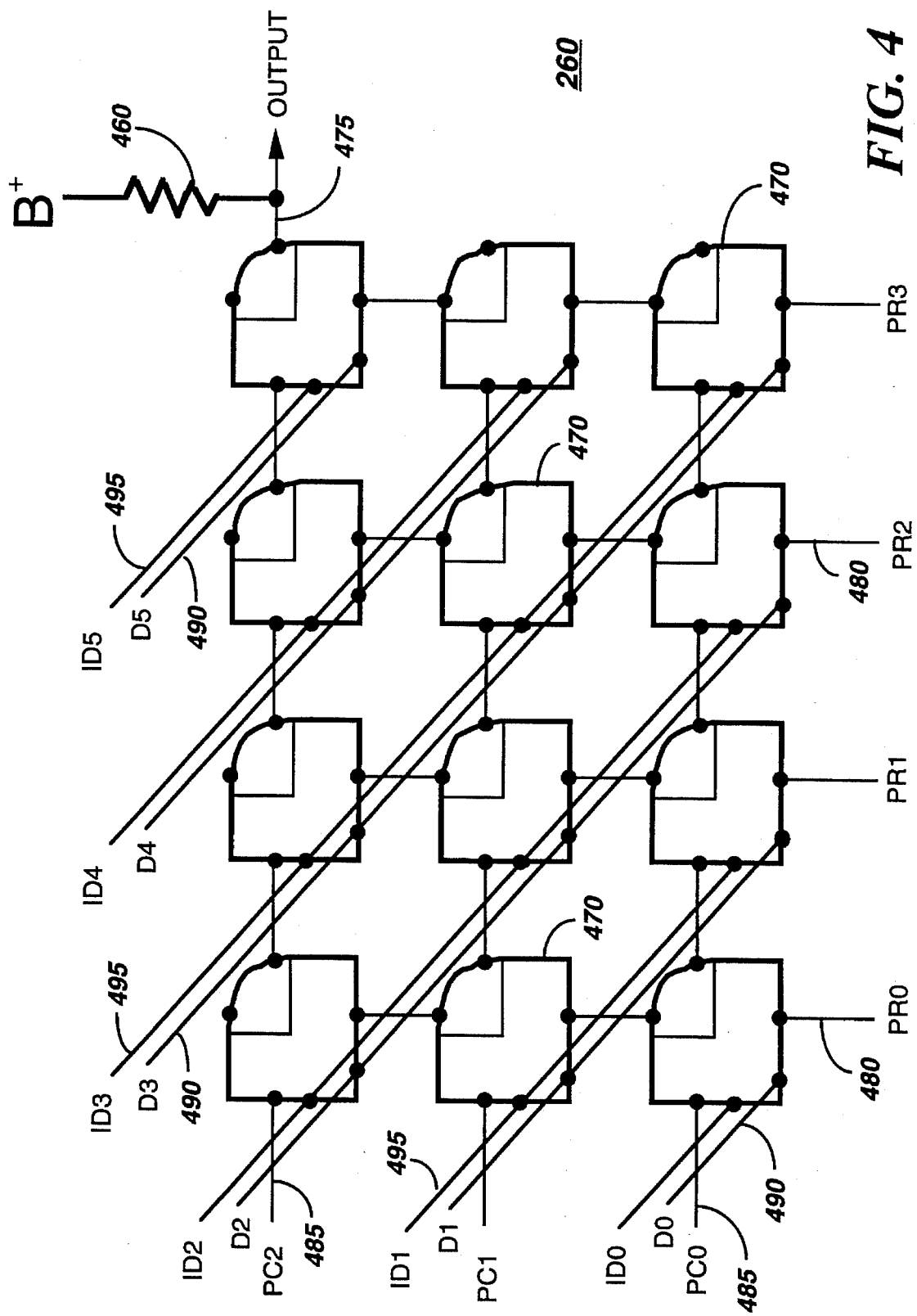
FIG. 4 is an electrical block diagram of matrix coupled recursive elements forming the weight detector of FIG. 2, in accordance with a first embodiment of the weight detector of the present invention.

Referring to FIG. 3, a diagram of a matrix arrangement 300 of recursive elements 340 is shown which defines the arrangement used to describe the matrix interconnection of the recursive elements 340 which comprise the weight detector 260 of FIG. 2, in accordance with a first embodiment of the weight detector of the present invention. The matrix arrangement 300 has rows 310, columns 320, and diagonals 330 identifying recursive elements 340. Several types of recursive elements 340 will be described herein, below, in accordance with alternative embodiments of the weight detector of the present invention. Shown are R rows 310, C columns 320, and R+C−1 diagonals 330. Each row 310 is identified by a row number i, i being an integer from 1 to R, each column 320 is identified by a column number j, j being an integer from 1 to C, and each diagonal 330 is identified by a diagonal number k, k being an integer from 1 to R+C−1. Each recursive element 340 is identified by a unique one of row and column couplets (i,j), and further identified by the diagonal number k, wherein k=i+j−1. The identification of each recursive element is in the following manner: row i, column j, diagonal k, and element (i,j). The quantity of recursive elements is not necessarily equivalent to the product of R and C; i.e., when a circuit comprising recursive elements 340 is not a complete rectangular arrangement, one or more couplets defined as above are not used for identifying recursive elements. Referring to FIG. 4, an electrical block diagram of the weight detector 260 used in the correlation detector 450 of FIG. 2 is shown, in accordance with the first embodiment of the weight detector of the present invention. The weight detector 260 comprises a coupling of recursive elements 470 in the matrix arrangement 300. In the example shown, the comparison word length, M, is 6 and the predetermined number, N, is 2. There are 12 recursive elements organized in a matrix having 3 rows, 4 columns, and 6 diagonals. Referring to FIG. 5, a symbol is shown which is used to represent the recursive elements 470, in accordance with the first and a second embodiment of the weight detector of the present invention. The recursive element 470 of FIG. 5 has an element output 810 coupled to two electrodes of an output section 811, which is a binary function of a first input 820, a second input 830, a third input 840, and a fourth input 850. Circuits suitable for use as the recursive element 470, in accordance with the first and second embodiments of the weight detector of the present invention, are further described herein, below. Referring back to FIG. 4, 3 first inputs of the 3 recursive elements (i,1), i=1 to 3, of column 1, which are predetermined binary column inputs 485 identified as PC0, PC1, and PC2 in FIG. 4, are coupled to 3 predetermined binary values, which are received by the weight detector 260 from the controller 420 in the setup word. The 4 second inputs of the 4 recursive elements (1,j), j=1 to 4, of row 1, which are predetermined binary row inputs 480 identified as PR0, PR1, PR2, and PR3, are coupled to 4 predetermined binary values, which are also received by the weight detector 260 from the controller 420 in the setup word. The first input 820 of each of the recursive elements 470 (i,j), i=1 to 3 and j=2 to 4, is coupled to the output 810 of the recursive element 470 (i,j−1). The second input 830 of each of the recursive elements 470 (i,j), i=2 to 3 and j=1 to 4, is coupled to the output 810 of the recursive element 470 (i−1,j). The predetermined binary column and row inputs 485 and 480 are coupled from a setup word such as of length 7. The 6 bit values of the inverted comparison word are coupled to 6 inverted data inputs 495 formed by coupling all of the third inputs 840 of the recursive elements 470 identified by the same diagonal number, k, and the 6 bit values of the comparison word are coupled to 6 data inputs 490 formed by coupling all of the fourth inputs of the recursive elements identified by the same diagonal number, k. The correlation detector output 475 of the weight detector 260 is the output 810 of the recursive element (3,4). A resistor 460 is coupled from the output of the weight detector 260 to the second supply voltage. The resistor 460, or an equivalent device, such as a field effect transistor, is required in first embodiment of the weight detector of the present invention when the recursive element 470 is implemented using a MOSFET logic circuit element 600, as described herein, below. The value of the correlation detector output 475 under various conditions is described more fully herein, below.

It will be appreciated that, in general, for any length M of a comparison word and for any predetermined number N less than M, the description of the coupling for the first embodiment of the weight detector of the present invention can be generalized as follows: There are (N+1)*(M−N) recursive elements organized in a matrix having N+1 rows, M−N columns, and M diagonals. The first input 820 of each of the recursive elements 470 (i,j), i=1 to N+1 and j=2 to M−N, is coupled to the output 810 of the recursive element 470 (i,j−1). The second input 830 of each of the recursive elements 470 (i,j), i=2 to N+1 and j=1 to M−N, is coupled to the output 810 of the recursive element 470 (i−1,j). The first input 820 of each of the recursive elements 470 (i,1), i=1 to N+1, is coupled to a unique one of N+1 predetermined binary column inputs 485. The second input 830 of each of the recursive elements 470 (1,j), j=1 to M−N, is coupled to a unique one of M−N predetermined binary row inputs 480. The predetermined binary column and row inputs 485 and 480 are coupled from a setup word of length M+1.

The M bit values of the inverted comparison word are coupled to M inverted data inputs 495 formed by coupling all of the third inputs 840 of the recursive elements 470 identified by the same diagonal number, k, and the M bit values of the comparison word are coupled to M data inputs 490 formed by coupling all of the fourth inputs of the recursive elements identified by the same diagonal number, k. The correlation detector output 475 of the weight detector 260 in this more generalized description of the first embodiment of the weight detector of the present invention is the output 810 of the recursive element 470 (N+1,M−N).

Referring to FIG. 6, FIG. 7 and FIG. 8, three electrical circuit diagrams of logic circuit elements 600, 700 and 800 suitable for use in the first and the second embodiments of the weight detector of the present invention are shown. Referring now to FIG. 6, a circuit diagram of the logic circuit element 600, which is suitable for use as the recursive element 470, is shown in accordance with the first embodiment of the weight detector of the present invention. The logic circuit element 600 comprises a first metal oxide semiconductor field effect transistors (MOSFET) 610 and a second MOSFET 620. Each of the two MOSFET's 610 and 620 comprises a gate electrode 630, a source electrode 650, and a drain electrode 640. The drain electrodes 640 of the two MOSFET's 610 and 620 in the logic circuit element 600 are coupled together, and to two output contacts 810, forming the output section 811 of the recursive element 470. The first input 820 of the recursive element 470 is the source electrode 650 of the first MOSFET 10. The second input 830 of the recursive element 470 is the source electrode 650 of the second MOSFET 620. The third input 840 of the recursive element 470 is the gate electrode 630 of the first MOSFET 610. The fourth input 850 of the recursive element 470 is the gate electrode 630 of the second MOSFET 620. In the logic circuit element 600, a binary value of zero is represented by a voltage substantially near the second reference voltage.

Referring to FIG. 7, a circuit diagram of a logic circuit element 700, which is suitable for use as the recursive element 470 in the first and second embodiments of the weight detector of the present invention is shown. The logic circuit element 700 comprises an OR gate 510, a first AND gate 520, and a second AND gate 530. The logic gates 510, 520, and 530 can utilize transistor transistor (TTL) logic, complementary metal oxide semiconductor transistor (CMOS) logic, or other logic well known to those skilled in the art. An output of the OR gate 510 couples to two output contacts 810, forming the output section 811 of the recursive element 470. The first input 820 of the recursive element 470 is a first input of the first AND gate 520. The second input 830 of the recursive element 470 is a first input of the second AND gate 530. The third input 840 of the recursive element 470 is a second input of the first AND gate 520. The fourth input 850 of the recursive element 470 is a second input of the second AND gate 530.

Referring to FIG. 8, a circuit diagram of a logic circuit element 800, also suitable for use as the recursive element 470 in the first and second embodiments of the weight detector of the present invention is shown. The logic circuit element 800 comprises a first NAND gate 710, a second NAND gate 720, and a third NAND gate 730. The logic gates 710, 720, and 730 can utilize of transistor transistor (TTL) logic, complementary metal oxide semiconductor transistor (CMOS) logic, or other logic well known to those skilled in the art. An output of the first NAND gate 710 couples to two output contacts 810, forming the output section 811 of the recursive element 470. The first input 820 of the recursive element 470 is a first input of the second NAND gate 720. The second input 830 of the recursive element 470 is a first input of the third NAND gate 730. The third input 840 of the recursive element 470 is a second input of the second AND gate 720. The fourth input 850 of the recursive element 470 is a second input of the third AND gate 730.

Shown in table 1 below are the conditions of the weights of the binary comparison word, for the embodiments of the weight detector 260, shown in FIG. 6, FIG. 7 and FIG. 8, when four different combinations of predetermined values coupled by the setup word from the controller 420 to the weight detector 260 are used, and when the recursive elements 470 of the weight detector 260 are implemented using logic circuit elements 600, 700, or 800. The weights (W0 and W1) in groups 1, 2, 5 and 6 are as defined above. The weights in groups 3, 4, 7 and 8 are shown with a prime (W0' and W1'), to indicate that the bit of the comparison word coupled to the recursive element (1,1) is not involved in the determination of the result, so the comparison word length in these case is effectively one bit shorter (M−1). It will be appreciated that, if the weight detector is used solely for making the comparisons as specified in groups 3, 4, 7 or 8, the recursive element (1,1) can be eliminated, in which case the predetermined input PC0 is coupled to the first input of element (1,2) and the predetermined input PR0 coupled to the second input of element (2,1). The groups 5 through 8 show the conditions when the bit values of the comparison word are inverted with respect to groups 1 through 4. The values of the bits in the setup word are shown in the following order: PC0, PC1, PC2, PR0, PR1, PR2, PR3.

TABLE 1

| Group | Setup Word | Conditions for a binary output of 1 | Conditions for a binary output of 0 |
|---|---|---|---|
| | | Comparison word coupled to data inputs, inverted comparison word coupled to inverted data inputs | |
| 1 | 0001111 | W1 > 2 (W0 < 4) | W0 >= 4 (W1 <= 2) |
| 2 | 1110000 | W0 >= 4 (W1 <= 2) | W1 > 2 (W0 < 4) |
| 3 | 0110111 | W1' <> 2 | W1' = 2 |
| 4 | 1001000 | W1' = 2 | W1' <> 2 |
| | | Comparison word coupled to inverted data inputs, inverted comparison word coupled to data inputs | |
| 5 | 0001111 | W0 > 2 (W1 < 4) | W1 >= 4 (W0 <= 2) |
| 6 | 1110000 | W1 >= 4 (W0 <= 2) | W0 > 2 (W1 < 4) |
| 7 | 0110111 | W0' <> 2 | W0' = 2 |
| 8 | 1001000 | W0' = 2 | W0' <> 2 |

Figure 9:
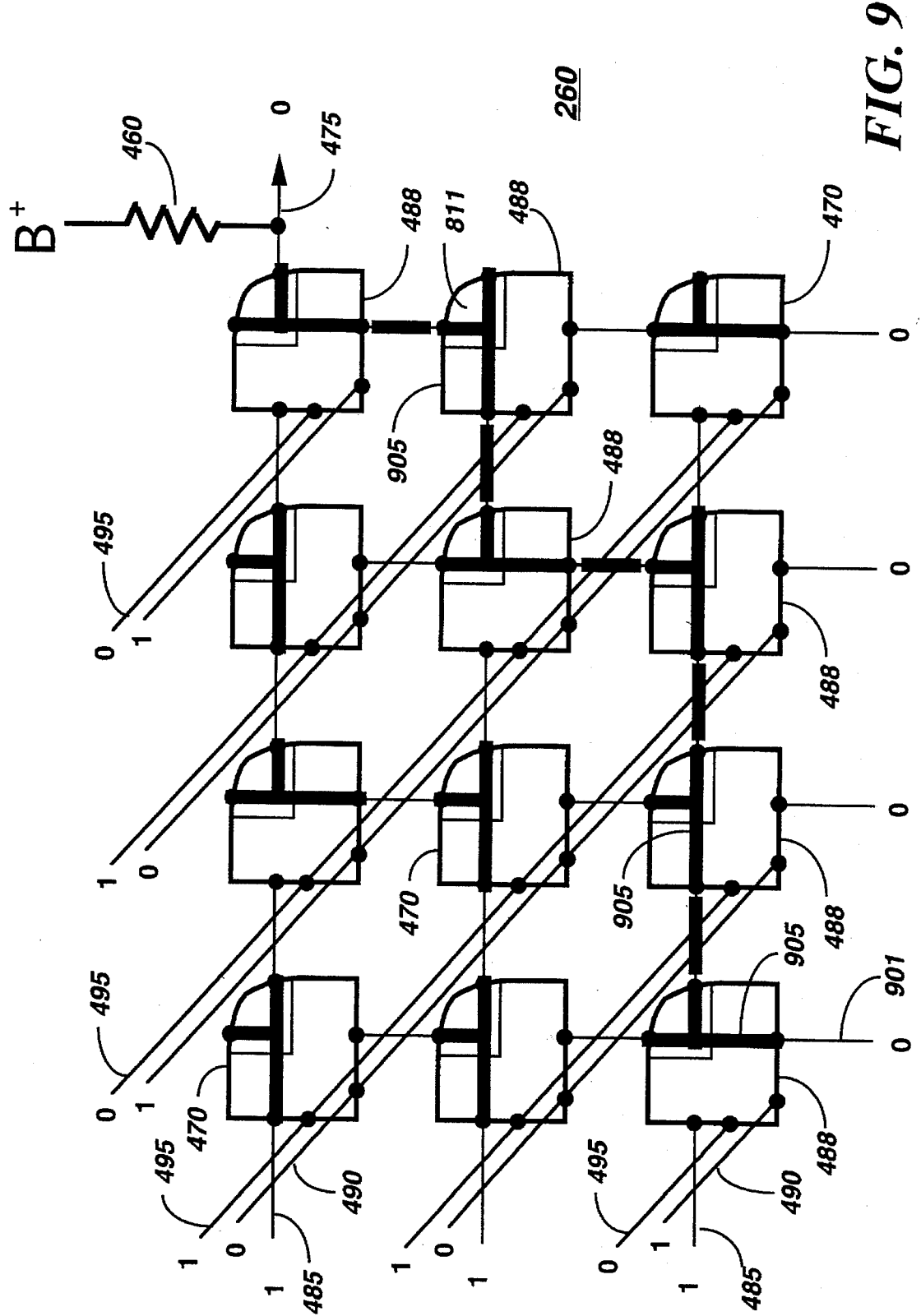
FIG. 9 is an electrical block diagram of the matrix coupled recursive elements shown in FIG. 4, with a specific example of logic flow shown, in accordance with the first embodiment of the weight detector of the present invention.

Referring now to FIG. 9, a specific case of a comparison word having the bit values 100101 (diagonal inputs) and using the setup word 1110000 (group 2) (column and row inputs) for the weight detector 260 is shown in accordance with the first embodiment of the weight detector of the present invention, illustrating the case where the recursive elements 470 are implemented using logic circuit elements 600. The low impedance path in each recursive element 470 is shown by heavy lines in FIG. 9. It can be seen that the low impedance path 905 exists from the output section 811 to the first input 820 or second input 830 of each logic circuit element 600, as determined by the values of the comparison word coupled to the third inputs 840 and fourth inputs 850. As can be seen in this example, a complete low impedance path exists from a second input 901 of a recursive element 488 (1,1) of the matrix, through other recursive elements 488, to the correlation detector output 475, causing a low voltage at the correlation detector output which represents a 0 indicating that the number of ones is greater than two, in accordance with table 1.

Figure 10:
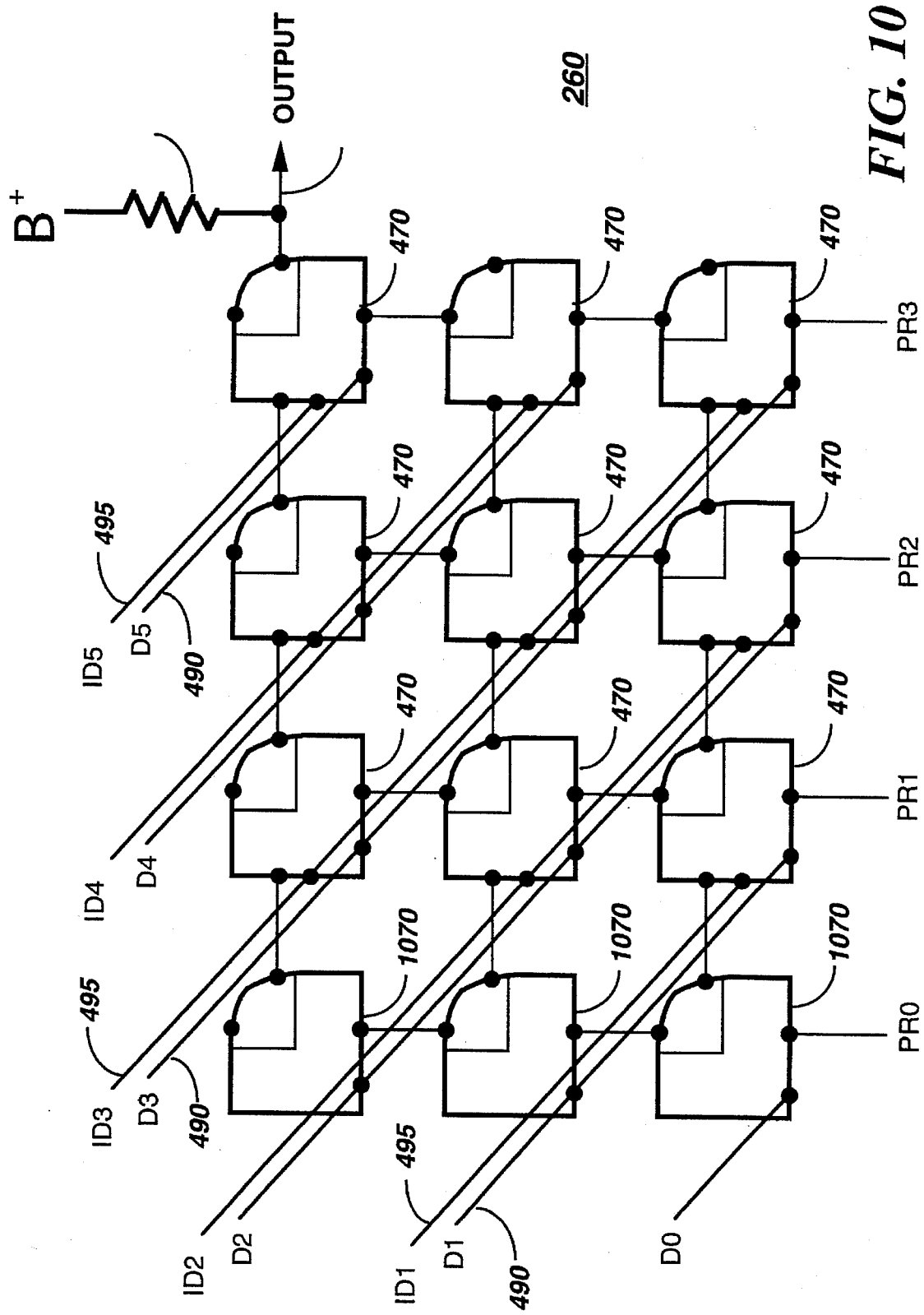
FIG. 10 is an electrical block diagram of matrix coupled recursive elements forming the weight detector of FIG. 2, in accordance with a second embodiment of the weight detector of the present invention.

Referring to FIG. 10, an electrical block diagram of the weight detector 260 used in the correlation detector 450 of FIG. 2 is shown, in accordance with the second embodiment of the weight detector of the present invention. This embodiment is very similar to the first embodiment of the weight detector of the present invention of FIG. 4 and FIG. 9. The significant differences are: The recursive elements in column 1 are second recursive elements 1070, in place of the recursive elements 470 used in the weight detector 260 described in reference to FIG. 4 The predetermined binary column input values PC0, PC1, and PC2 do not exist, the predetermined binary row input values coupled to the first row are all of the same value, in this example, binary 1, and the inverted binary word inputs ID0, ID1, and ID2 are not coupled to the recursive elements in column 1, which are second recursive elements 1070.

Figure 11:
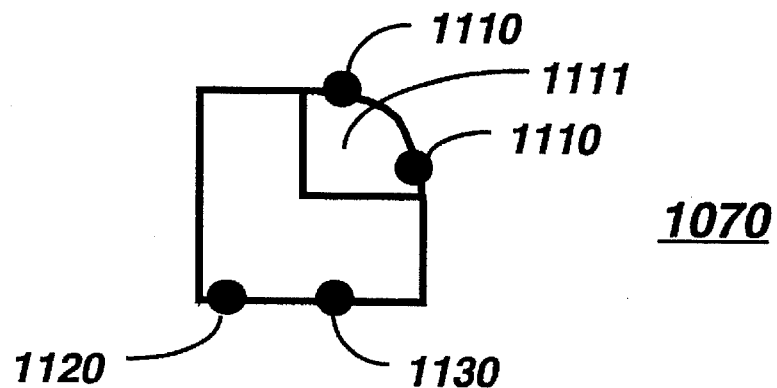
FIG. 11 is a symbol used to represent a second recursive element suitable for use in the weight detector shown in FIG. 10, in accordance with the second embodiment of the weight detector of the present invention.

Referring to FIG. 11, a symbol is shown which is used to represent the second recursive elements 1070 shown in FIG. 10, in accordance with the second embodiment of the weight detector of the present invention. The second recursive element 1070 of FIG. 11 has an element output 1110 coupled to two contacts of an output section 1111, which is a binary function of a second input 1130 and a fourth input 1120.

Figure 12:
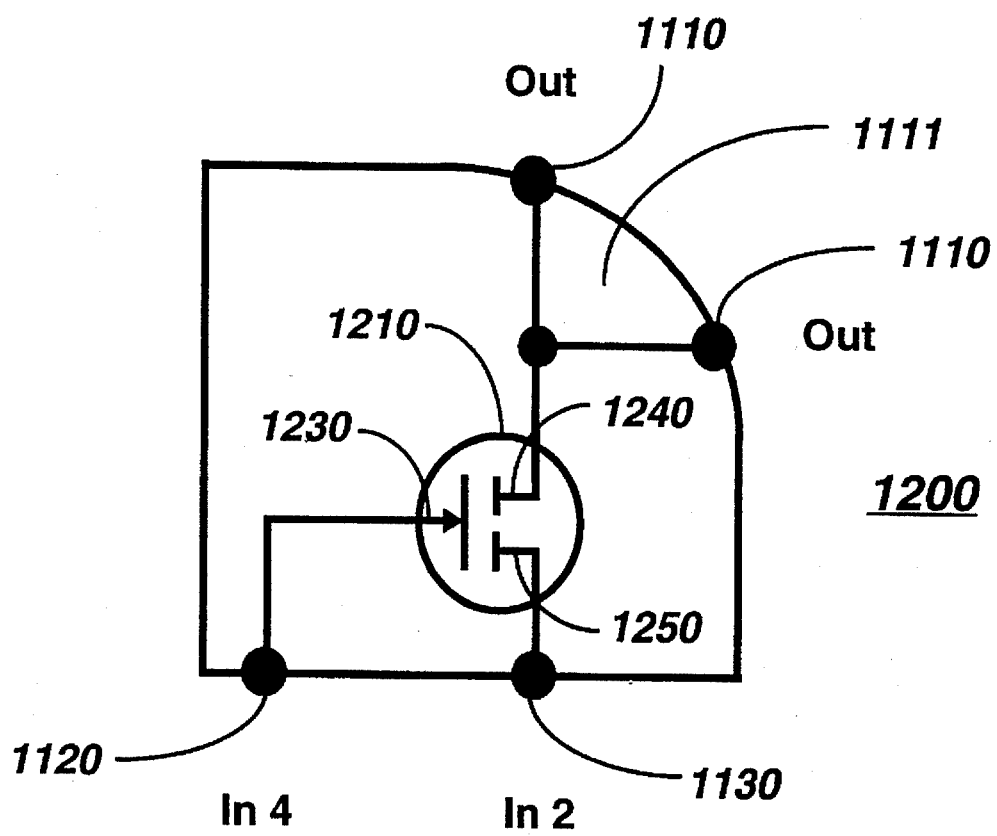
FIG. 12 is an electrical circuit diagram of the second recursive element used in accordance with the second embodiment of the weight detector of the present invention.

Referring now to FIG. 12, a circuit usable for the second recursive element 1070 shown in FIG. 11, in accordance with the second embodiment of the weight detector of the present invention, is shown. A logic circuit element 1200 comprises a MOSFET 1210. The MOSFET 1210 comprises a gate electrode 1230, a source electrode 1250, and a drain electrode 1240. The drain electrode 1240 of the MOSFET 1210 couples to the two output contacts 1110 of the output section 1110 of the second recursive element 1070. The second input 1130 of the second recursive element 1070 is the source electrode 1250 of the MOSFET 1210. The fourth input 1120 of the second recursive element 1070 is the gate electrode 1230 of the MOSFET 1210. In the logic circuit element 1200, a binary value of zero is represented by a voltage substantially near the second reference voltage.

Referring back to FIG. 10, the resistor 460, or an equivalent device, such as a field effect transistor, is required in the second embodiment of the weight detector of the present invention. The value of the correlation detector output 475 under various conditions is described more fully herein, below.

It will be appreciated that, in general, for any length M of a comparison word and for any predetermined number N less than M, the description of the coupling for the second embodiment of the weight detector of the present invention can be generalized as follows: There are (N+1)*(M−N−1) first recursive elements 470 and (N+1) second recursive elements 1070 organized in a matrix having N+1 rows, M−N columns, and M diagonals. The N+1 second recursive elements 1070 form column 1 of the matrix. The first input 820 of each of first recursive elements 470 (i,j), i=1 to N+1 and j=3 to M−N, is coupled to the output 810 of the first recursive element (i,j−1). The first input 820 of each of the first recursive elements 470 (i,2), i=1 to N+1, is coupled to the output 1110 of the second recursive element 1070 (i,1). The second input 830 of each of the first recursive elements 470 (i,j), i=2 to N+1 and j=2 to M−N, is coupled to the output 810 of the first recursive element 470 (i−1,j). The second input 1130 of each of the second recursive elements (i,1), i=2 to N+1, is coupled to the output 1110 of the second recursive element 1070 (i−1,1). The second input 830 of each of the first recursive elements 470 (1,j), j=2 to M−N, is coupled first binary values. The second input of the second recursive element (1,1) is coupled to the first binary value. Each of M data inputs 490 couples the value of a unique one of the M bits of the binary word to fourth inputs 850 of the fourth inputs 1120 of the first and second recursive elements 470 and 1070 identified by a unique one of the M diagonal numbers (k). Each of M inverted data inputs 495 couples the inverted value of a unique one of the bits of the binary word to third inputs 840 of the first recursive elements 470 identified by a unique one of the M diagonal numbers (k). The correlation detector output 475 of the weight detector 260 in the second embodiment of the weight detector of the present invention is the output 810 of the first recursive element 470 (N+1,M−N).

Shown in table 2 below are the conditions of the weights of the binary comparison word, for the embodiments of the weight detector 260, when first and second binary values are coupled by the setup word from the controller 420 to the weight detector 260, and when the recursive elements 470 and 1070 of the weight detector 260 are comprised of logic circuit elements 600 and 1200. It will be appreciated that, in similarity to the alternative logic circuits for the recursive element 470, there are alternative logic circuits possible for the second recursive element 1070, from which the weight detector could be constructed for the second embodiment of the weight detector of the present invention. The weights (W0 and W1) in groups 1, 2, 3 and 4 are as defined above.

Groups 3 and 4 show the conditions when the bit values of the comparison word are inverted. The values of the bits in the setup word are shown in the following order: PR0, PR1, PR2, PR3.

TABLE 2

| Group | Setup Word | Conditions for a binary output of 1 | Conditions for a binary output of 0 |
|---|---|---|---|
| Comparison word coupled to data inputs, inverted comparison word coupled to inverted data inputs | | | |
| 1 | 1111 | W1 > 2 (W0 < 4) | W0 >= 4 (W1 <= 2) |
| 2 | 0000 | W0 >= 4 (W1 <= 2) | W1 > 2 (W0 < 4) |
| Comparison word coupled to inverted data inputs, inverted comparison word coupled to data inputs | | | |
| 3 | 1111 | W0 > 2 (W1 < 4) | W1 >= 4 (W0 <= 2) |
| 4 | 0000 | W1 >= 4 (W0 <= 2) | W0 > 2 (W1 < 4) |

Figure 13:
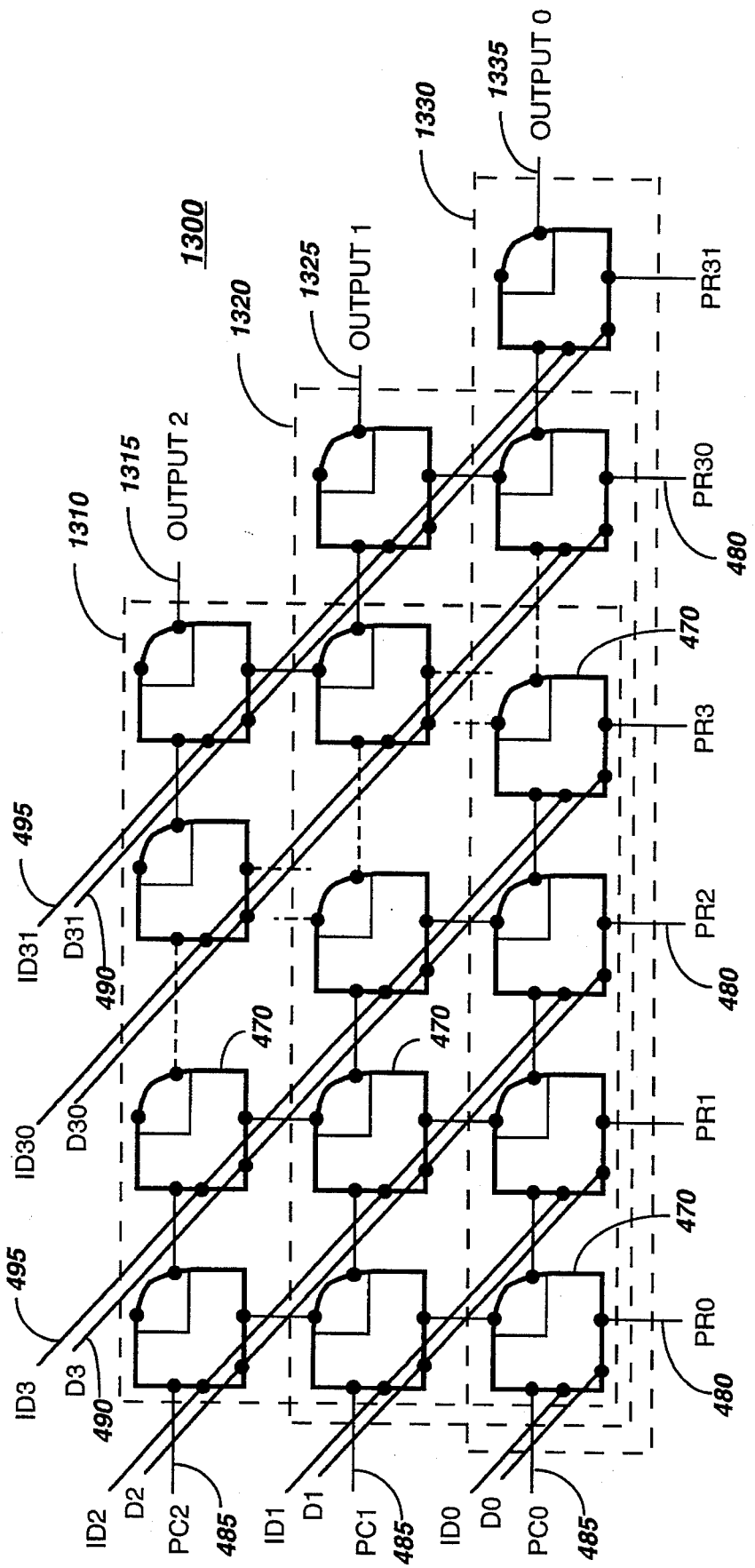
FIG. 13 is an electrical block diagram of matrix coupled recursive elements forming the weight detector of FIG. 2, in accordance with the first embodiment of the weight detector of the present invention.

Referring to FIG. 13, an example is shown of a logic circuit comprised of recursive elements organized in a matrix fashion, in accordance with the first embodiment of the weight detector of the present invention. A logic circuit 1300 is a combination of three of the matrix arrangements 300 as described in reference to FIG. 4. The three matrices are shown in dashed lines as a first matrix 1310, a second matrix 1320, and a third matrix 1330. The logic circuit comprised of the matrix 1310 provides a third output 1315 based on the weight of a 32 bit word, as may be used in the selective call device 400 in which a synchronization word has 32 bits and in which synchronization is detected when there are zero, one, or two errors detected. When all the predetermined row inputs 480 have a binary value 1, all predetermined column inputs 485 have the a binary value 0, and the comparison word is connected as in group 1 of table 1, the third output will be a binary one when W1, the number of binary ones in the comparison word is greater than 2. Similarly, a second output 1325 of second matrix 1320 will be one when W1, the number of binary ones in the comparison word is greater than 1. Similarly, a first output 1335 of third matix 1330 will be one when W1, the number of binary ones in the comparison word is greater than 0. This version of the first embodiment of the weight detector of the present invention thus provides additional information that may be useful, for instance, in determining the quality level of a received signal wherein the synchronization word is 32 bits long. This weight detector 1300 comprises 90 recursive elements.

Figure 14:
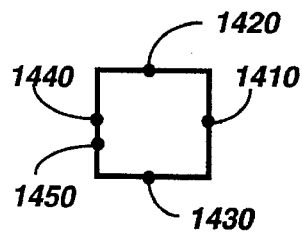
FIG. 14 and FIG. 16 are symbols used to represent recursive elements suitable for use with a third and a fourth embodiment of the weight detector of the present invention.

Referring to FIG. 14, a symbol is shown for a recursive element 1400 suitable for use in accordance with third and fourth embodiments of the weight detector of the present invention. The recursive element 1400 has a first output 1410 which is a function of a first input 1430 and a second input 1440, and a second output 1420 which is a function of the second input 1440 and a third input 1450.

Figure 15:
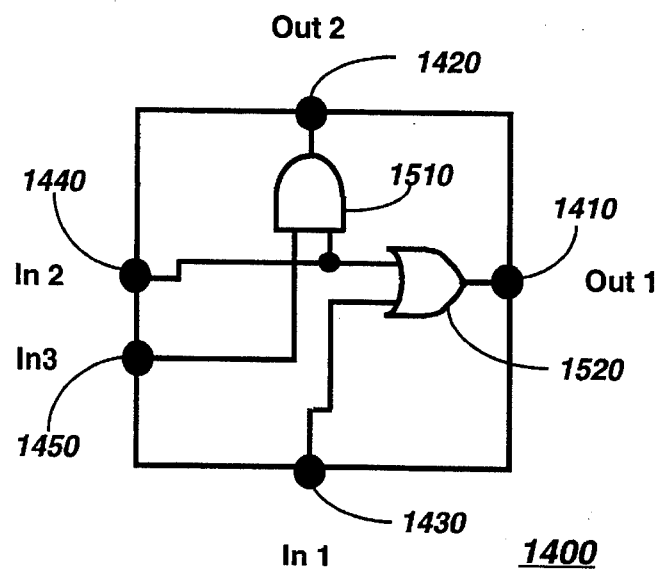
FIG. 15 and 17 are electrical circuit diagrams of recursive elements used in accordance with the third and fourth embodiments of the weight detector of the present invention.

Referring to FIG. 15, an electrical circuit diagram of a logic circuit usable for the recursive element 1400 is shown in accordance with the third and fourth embodiments of the weight detector of the present invention. The first output 1410 of the recursive element 1400 is an output of an OR gate 1520. The second output 1420 of the recursive element 1400 is an output of an AND gate 1510. The first input 1430 of the recursive element 1400 is a first input of the OR gate 1520. The second input 1440 of the recursive element 1400 is coupled to a first input of the AND gate 1510 and to a second input of the OR gate 1520. The third input 1450 of the recursive element is a second input of the AND gate 1510.

Figure 16:
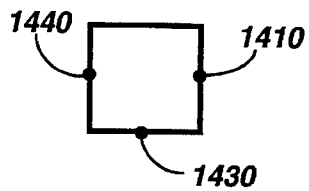

Referring to FIG. 16, a symbol is shown for a fourth recursive element 1600 suitable for use in accordance with the fourth embodiment of the weight detector of the present invention. The fourth recursive element 1600 has a first output 1610 which is a function of a first input 1630 and a second input 1640.

Figure 17:
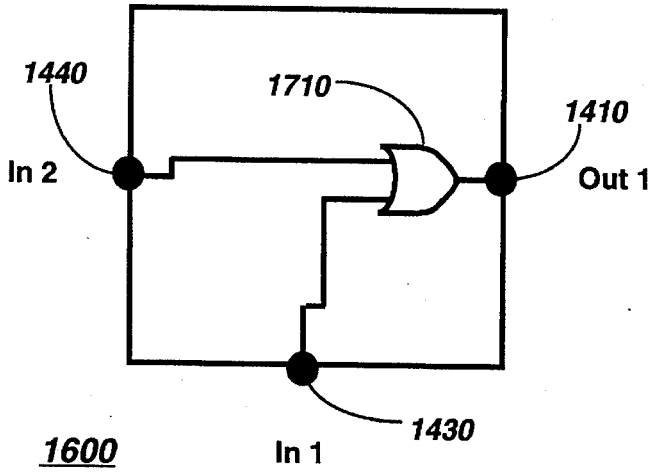

Referring to FIG. 17, an electrical circuit diagram of a logic circuit usable for the recursive element 1600 is shown in accordance with the fourth embodiment of the weight detector of the present invention. The first output 1610 of the recursive element 1600 is an output of an OR gate 1710. The first input 1630 of the recursive element 1600 is a first input of the OR gate 1710. The second input 1640 of the recursive element 1600 is a second input of the OR gate 1710

Figure 18:
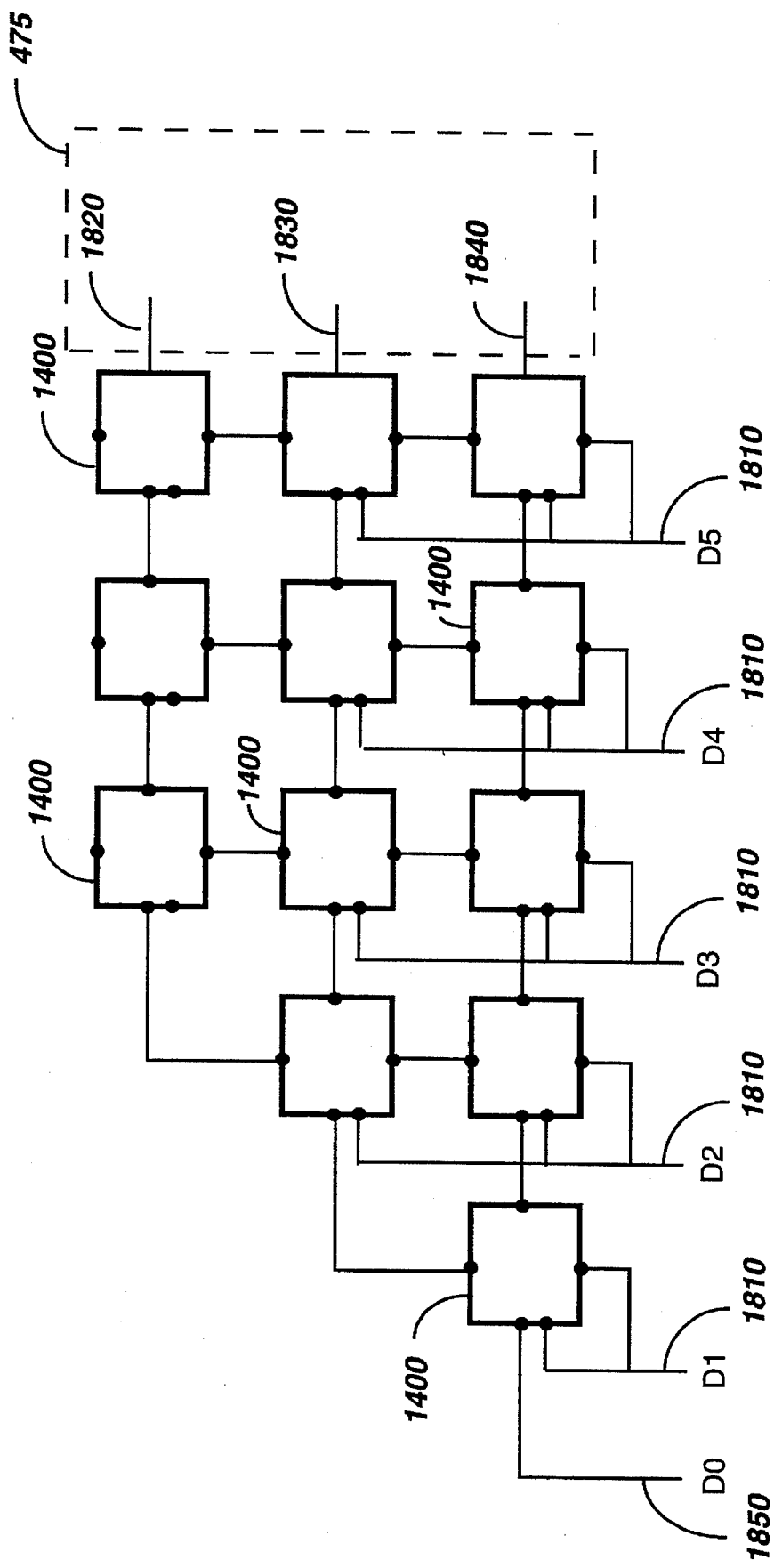
FIG. 18 is an electrical block diagram of matrix coupled recursive elements forming the weight detector of FIG. 2, in accordance with the third embodiment of the weight detector of the present invention.

Referring to FIG. 18, an electrical block diagram of the weight detector 260 used in the correlation detector 450 of FIG. 2 is shown, in accordance with the third embodiment of the weight detector of the present invention. The weight detector 260 comprises a coupling of recursive elements 1400 in the matrix arrangement 300 of FIG. 4. In this example, the comparison word length, M, is 6 and the predetermined number, N, is 2. There are 12 recursive elements organized in a matrix having 3 rows and 5 columns. It will be appreciated that, although the number of rows and columns for the example of the third embodiment of the weight detector of the present invention described herein is the same as for first and second embodiments of the weight detector of the present invention, this is not generally the case, as will be shown herein, below. In the third embodiment of the weight detector of the present invention, no predetermined binary values are coupled to the weight detector 260 from the controller 420, as is done in the first and second embodiments of the weight detector of the present invention. The logic circuit has 6 data inputs 1810 for coupling the 6 bits of the binary word to 9 of the 12 recursive elements 1400. The first input 1430 of each of the recursive elements (i,j), i=2 to 3 and j=1 to 5, is coupled to the second output 1420 of the recursive element 1400 (i−1,j). The second input 1440 of each of the recursive elements 1400 (i,j), i=1 to 3 and j=i+1 to 5, is coupled to the first output 1410 of the recursive element 1400 (i,j−1). The second input 1440 of each of the recursive elements (i,j), i=2 to 3 and j=i, is coupled to the second output 1420 of the recursive element 1400 (i−1,j−1). Each of 5 of the data inputs 1810 couples the value of a unique one of the 6 bits of the binary word to third inputs 1450 of the recursive elements (i,j) in a column j, i=1 for j=1 and i=1 to 2 for j=2 to 5, and further couples the value of each unique one of the 6 bits of the binary word to the first input 1430 of the recursive element (1,j), for j=1 to 5. One data input 1850 couples the value of a unique one of the bits of the binary word, not coupled to the data inputs 1810, to the second input 1440 of the recursive element 1400 (1,1). The first output 1410 of the recursive element (3,5) comprises a first logic circuit output 1820, which has a binary value of 1 when W1, the number of binary 1's in the comparison word, is greater than 2. The first outputs 1410 of the recursive elements (2,5) and (1,5) comprise 2 additional logic circuit outputs 1830 and 1840. The binary value of logic circuit output 1830 has a binary value of 1 when W1, the number of binary 1's in the comparison word, is greater than 1. The binary value of logic circuit output 1840 has a binary value of 1 when W1, the number of binary 1's in the comparison word, is greater than 0. The first logic circuit output 1820 and the additional logic circuit outputs 1830 and 1840 comprise the correlation detector output 475.

It will be appreciated that, in general, for any length M of a comparison word and for any predetermined number N less than M, the description of the coupling for the third embodiment of the weight detector of the present invention can be generalized as follows: There are (N+1)*(M−1)−(N*(N+2)/2 recursive elements organized in a matrix having N+1 rows and M−1 columns. The logic circuit has M data inputs 1810 for coupling the M bits of the binary word to (N)*(M−1)−((N−1)*N/2) of the recursive elements 1400. The first input 1430 of each of the recursive elements (i,j), i=2 to N+1 and j=1 to M−1, is coupled to the second output 1420 of the recursive element 1400 (i−1,j). The second input 1440 of each of the recursive elements 1400 (i,j), i=1 to N+1 and j=i+1 to M−1, is coupled to the first output 1410 of the recursive element 1400 (i,j−1). The second input 1440 of each of the recursive elements (i,j), i=2 to N+1 and j=i, is coupled to the second output 1420 of the recursive element 1400 (i−1,j−1). Each of M−1 of the data inputs 1810 couples the value of a unique one of the M bits of the binary word to third inputs 1450 of the recursive elements (i,j) in a column j, i=1 to j for j=1 to N−1 and i=1 to N for j=N to M−1, and further couples the value of each unique one of the bits of the binary word to the first input 1430 of the recursive element (1,j) in the column j, for j=1 to M−1. One data input 1850 couples the value of one of the M bits of the binary word, being none of the M bits of the binary word coupled to the M−1 of the data inputs 1810, to the second input 1440 of the recursive element 1400 (1,1). The first output 1410 of the recursive element (N+1,M−1) comprises the first logic circuit output 1820, which has a binary value of 1 when W1, the number of binary 1's in the comparison word, is greater than N. The first outputs 1410 of the recursive elements (i,M−1), i=1 to N, comprise N additional logic circuit outputs, each identified as output (i), the binary value of the logic circuit output (i) having a binary value of 1 when W1, the number of binary 1's in the comparison word, is greater than (i). The first logic circuit output 1820 and the additional logic circuit outputs comprise the correlation detector output 475.

Figure 19:
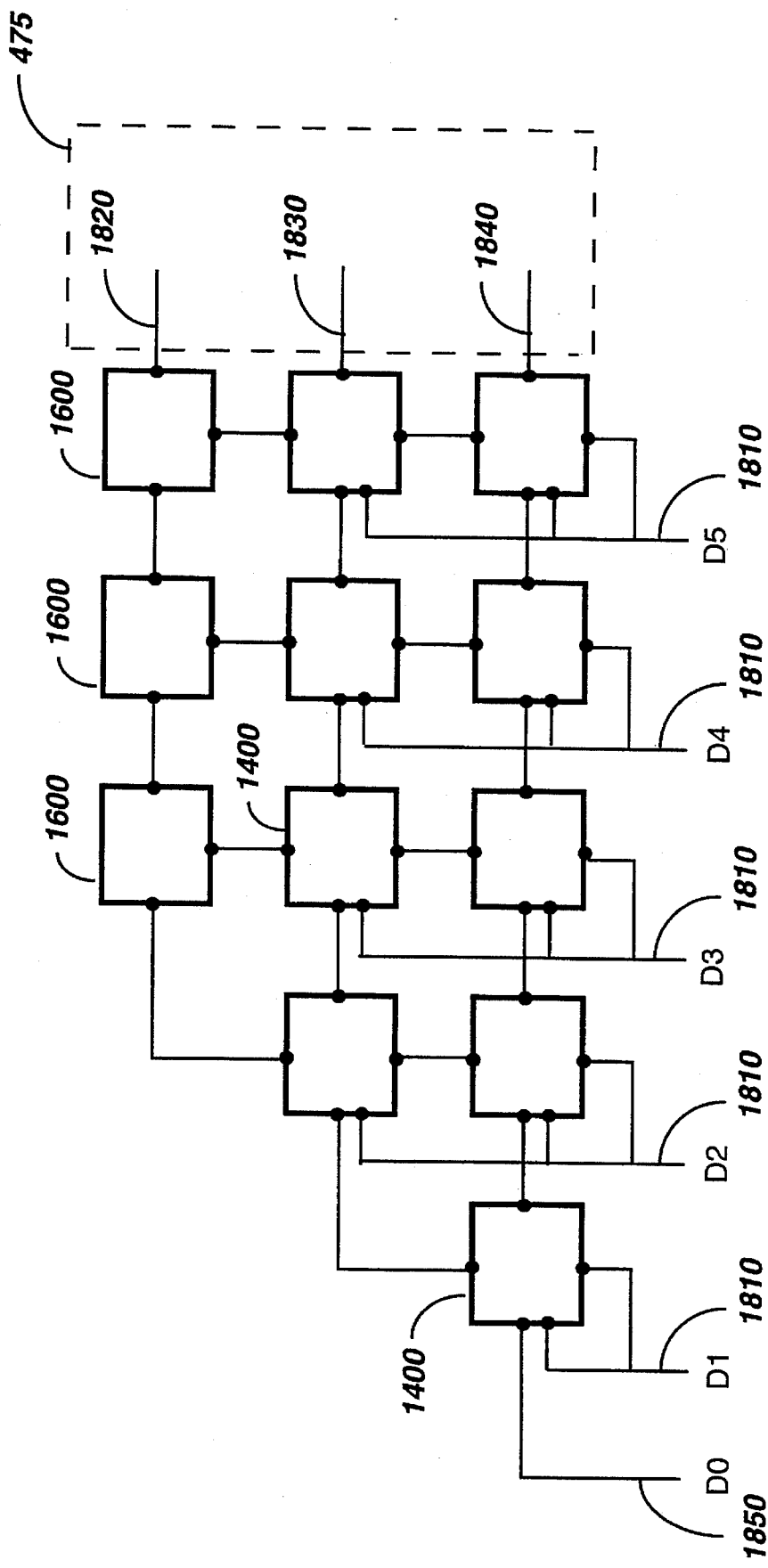
FIG. 19, FIG. 20, FIG. 21 and FIG. 22 are electrical block diagrams of matrix coupled recursive elements, each of which forms the weight detector of FIG. 2, in accordance with the fourth embodiment of the weight detector of the present invention.

Referring to FIG. 19, an electrical block diagram of the weight detector 60 used in the correlation detector 450 of FIG. 2 is shown, in accordance with the fourth embodiment of the weight detector of the present invention. This embodiment is very similar to the third embodiment of the weight detector of the present invention of FIG. 18. The significant difference is that the recursive elements in row 3 (row N+1 in the general case) are fourth recursive elements 1600.

Figure 20:
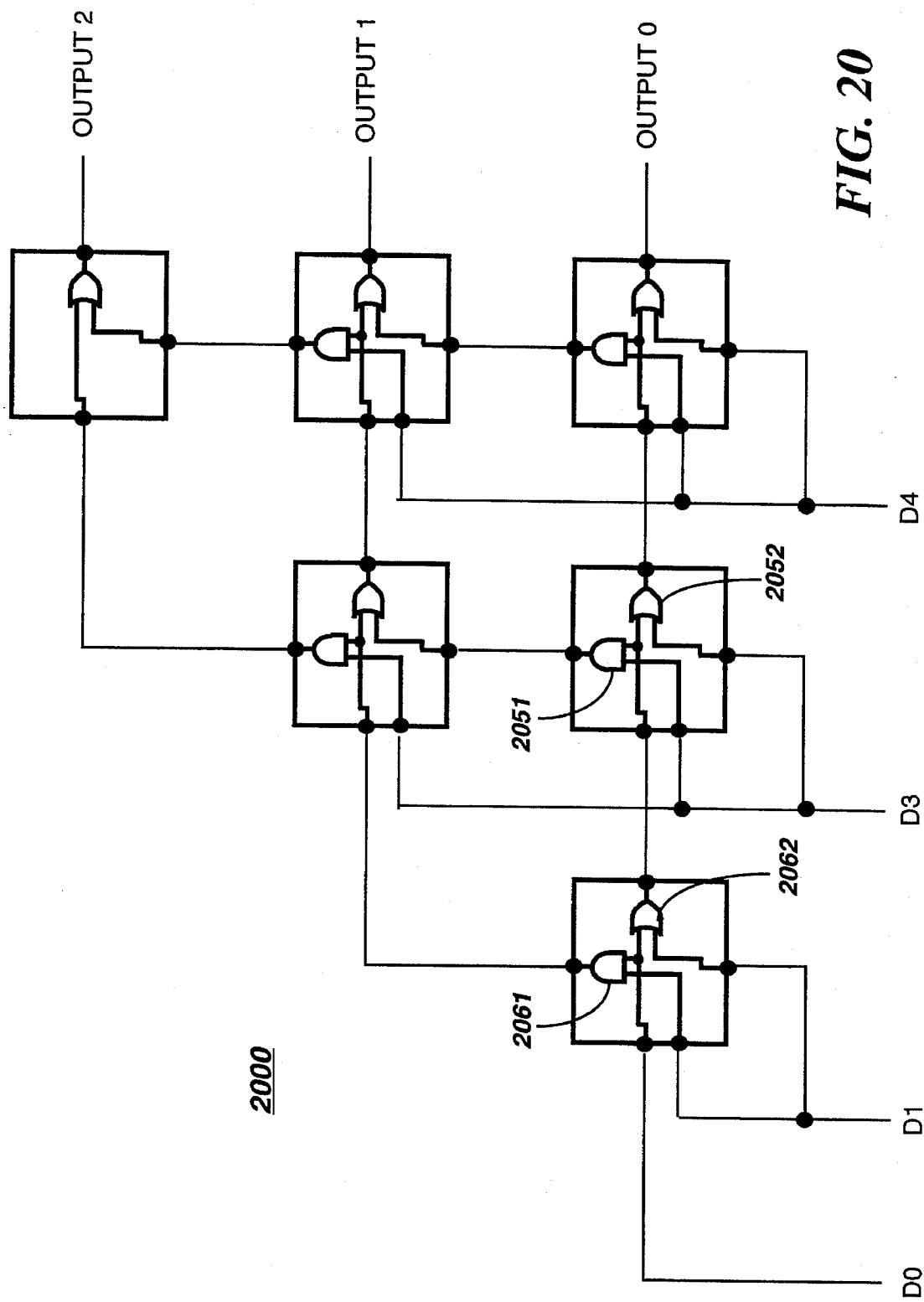
Figure 21:
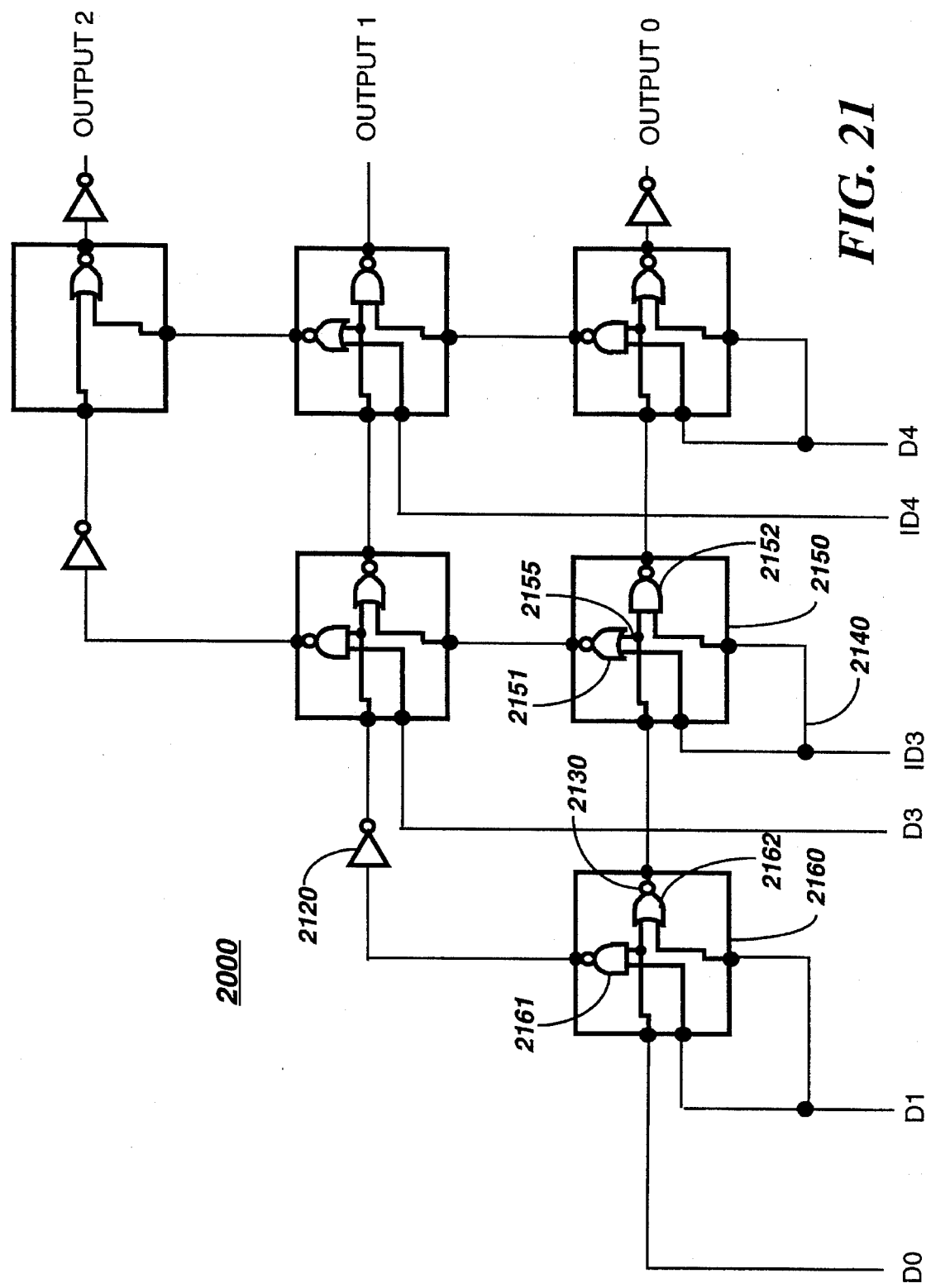

Referring to FIG. 20 and FIG. 21, electrical circuit diagrams of a weight detector 2000 usable in a correlation detector for a four bit synchronization word are shown, in accordance with the fourth embodiment of the weight detector of the present invention. The logic circuit elements are detailed in the matrix interconnection of recursive elements shown in FIG. 20 and FIG. 21, to demonstrate that the fourth embodiment of the weight detector of the present invention described with reference to FIG. 19 is realizable by using NAND, NOR, and INVERTER logic elements in place of AND and OR elements. Referring to FIG. 20, the weight detector 2000 is comprised of recursive elements implemented with AND and OR gates as described with reference to FIG. 15 and FIG. 17. Referring to FIG. 21, this may be easily seen by considering that a NAND gate 2161 in a recursive element 2160, in conjunction with an INVERTER logic element 2120 is effectively an AND gate 2061 shown in FIG. 20. Further, when an inversion output 2130 of a NOR gate 2162 of the recursive element 2160 is considered at inputs 2155 to an NAND gate 2152 and a NOR gate 2151 of recursive element 2150, instead of at the output of the NOR gate 2162, then the NOR gate 2162 of the recursive element 2160 is effectively an OR gate 2062 shown in FIG. 20. Further, by considering an inverted input 2140 to be a non-inverted input with inversions applied at the NAND gate 2152 and NOR gate 2151 of the recursive element 2150, then the NAND gate 2152 and NOR gate 2151 of recursive element 2150 are, effectively, an AND gate 2051 and OR gate 2052 shown in FIG. 20. Such reasoning extends throughout the weight detector 2000. The same reasoning is applicable to the third embodiment of the weight detector of the present invention as well.

Figure 22:
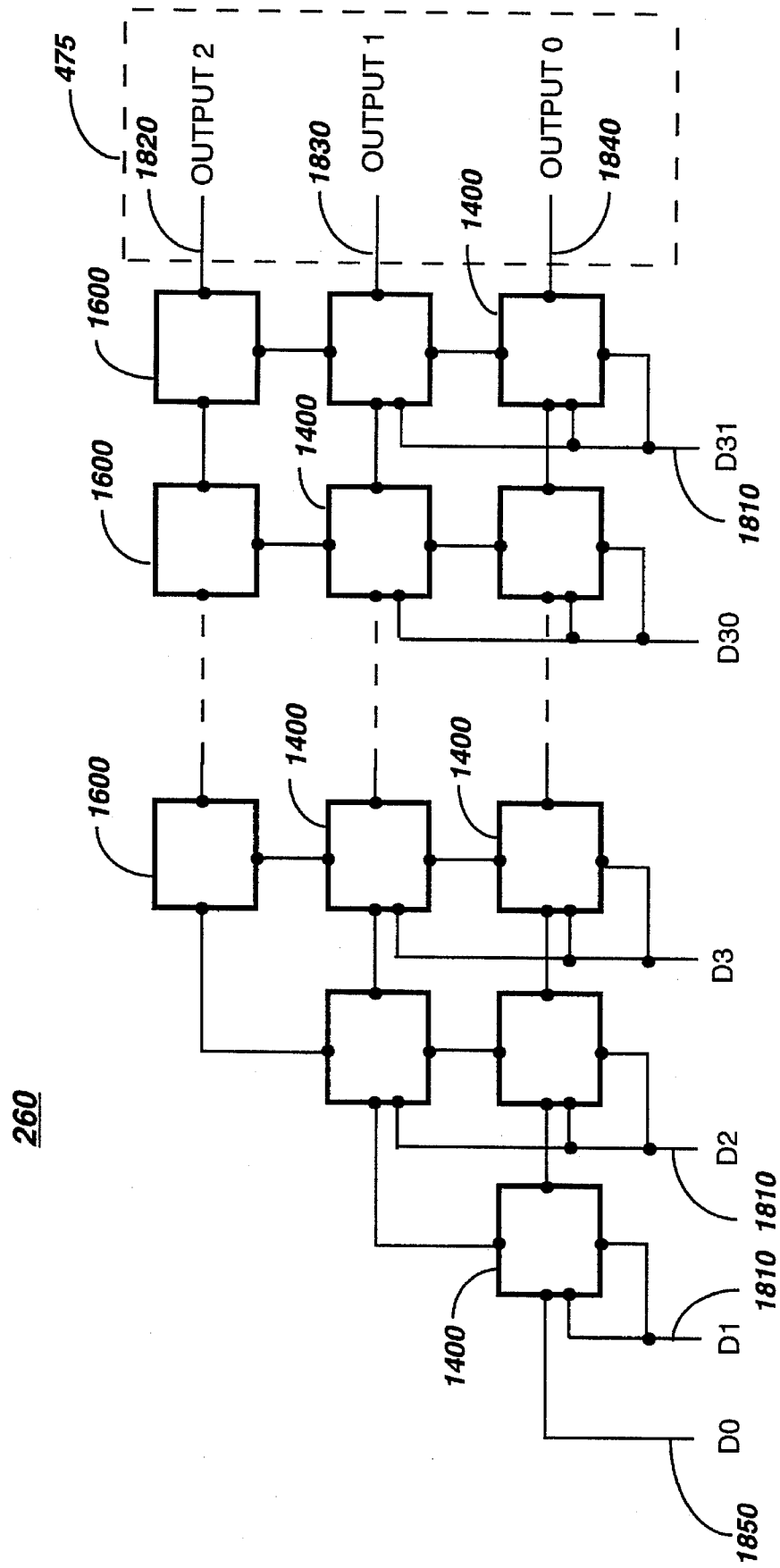

Referring to FIG. 22, an electrical block diagram of the weight detector 60 used in the correlation detector 450 of FIG. 2 is shown, in accordance with the fourth alternate embodiment of the weight detector of the present invention. An example is shown for the weight detector 260 for use in the selective call device 400 in which a synchronization word has 32 bits and in which synchronization is detected when there are zero, one, or two errors detected. This circuit comprises 30 fourth recursive elements 1600 and 60 first recursive elements 1400.

It will be appreciated that other logic elements can be used in place of those described for logic circuit elements 600, 1200, 1400, and 1600, and that the elements can comprise a variety of integrated circuit technologies, such as complementary metal oxide semiconductor (CMOS), transistor-transistor logic (TTL), emitter coupled logic (ECL), etc., as appropriate for differing applications.

It will be appreciated that the unique first and second embodiments of the weight detector of the present invention permit the implementation of a weight detector having a number of gates approximately proportional to the product of the word length, M, and the predetermined number against which it is to be compared, N, plus one, when M is large (e.g., 32), and N is small (e.g., 2). Thus, for a 32 bit word and an acceptable error limit of two (which is the predetermined number N, when the circuit is used for correlation detection), the number of recursive elements is approximately 3*32=96. (The exact number is 90). For the third and fourth embodiments, the number of gates is approximately proportional to the product of N+1 and M−1, when M is large and N small. For the same example, the number of recursive elements is approximately 3*31=93. (The exact number is 90). In comparison, when the same function is attempted with a combination of a plurality of 32 bit input, one output AND gates, and a many input OR gate, which would be used for a straight forward combinatorial implementation of the same function, the resulting circuit is massive, approximately 4500 gates. An alternative is to perform the function using shift registers and a processor, but the associated cycle time and processor loading become a significant issue in low cost, low power devices. It will be further appreciated that when the recursive elements are comprised of logic circuit elements 600 and 1200, the number of transistors required is minimal.

By now it should be appreciated that there has been provided an apparatus which generates a weight measurement of a binary word using a minimal number of transistors, thereby being very low cost and operating at a speed involving only gate delays, and with very low power.

We claim:

1. An apparatus for making a comparison of the number of bits having a first binary value within a binary word of M bits to a predetermined number (N), wherein each of the bits of the binary word has a first or a second binary value, and wherein M is a positive non-zero integer and N is an integer greater than or equal to zero and less than or equal to M−1, the apparatus being a logic circuit comprising:

(N+1)*(M−N) recursive elements interconnected in a matrix, the matrix being an arrangement of said recursive elements in rows, columns, and diagonals;

M data inputs for coupling the M bits of the binary word to said recursive elements;

M inverted data inputs for coupling inverted values of the M bits of the binary word to said recursive elements;

N+1 binary column setup inputs coupled to one column of said recursive elements;

M−N binary row setup inputs coupled to one row of said recursive elements; and a logic circuit output comprising an output of one of said recursive elements, the logic circuit output having a binary value determined by a comparison of the number of bits having a first binary value within the binary word, to the predetermined number (N), the comparison being determined by the values of the binary row and column setup inputs.

2. The apparatus according to claim 1, wherein:

the matrix is an arrangement of said recursive elements organized in N+1 rows, M−N columns, and M diagonals of said recursive elements, each row is identified by a row number i, i being an integer from 1 to N+1, each column being identified by a column number j, j being an integer from 1 to M−N, and each diagonal being identified by a diagonal number k, k being an integer from 1 to M, and each of said recursive elements is identified by a unique one of (N+1)*(M−N) row and column couplets (i,j), and is further identified by the diagonal number (k), k=i+j−1, and wherein:

a first input of each of the recursive elements (i,j), i=1 to N+1 and j=2 to M−N, is coupled to an output of the recursive element (i,j−1);

a second input of each of the recursive elements (i,j), i=2 to N+1 and j=1 to M−N, is coupled to an output of the recursive element (i−1,j);

a first input of each of the recursive elements (i,1), i=1 to N+1, is coupled to a unique one of said N+1 binary column setup inputs; and a second input of each of the recursive elements (1,j), j=1 to M−N, is coupled to a unique one of said M−N binary row setup inputs.

3. The apparatus according to claim 2 wherein:

each of said M data inputs couples the value of a unique one of the M bits of the binary word to fourth inputs of the recursive elements identified by a unique one of the M diagonal numbers (k);

each of said M inverted data inputs couples the inverted value of a unique one of the M bits of the binary word to third inputs of the recursive elements identified by a unique one of the M diagonal numbers (k); and the output of the recursive element (N+1,M−N) comprises said logic circuit output.

4. The apparatus according to claim 2 wherein each of said recursive elements includes two metal oxide semiconductor field effect transistors (MOSFETs), each having a drain, a source, and a gate electrode.

5. The apparatus according to claim 4 wherein:

the drain electrodes of the two MOSFETs in each of said recursive elements are coupled together, forming the output of said recursive element;

the first input of each of said recursive elements is the source electrode of a first MOSFET;

the second input of each of said recursive elements is the source electrode of a second MOSFET;

the third input of each of said recursive elements is the gate electrode of the first MOSFET; and the fourth input of each of said recursive elements is the gate electrode of the second MOSFET.

6. The apparatus according to claim 2 wherein each of said recursive elements comprises three dual input complementary metal oxide semiconductor field effect transistor NAND gates.

7. The apparatus according to claim 1, wherein the N+1 binary column setup inputs are at one of the first and second binary states and the M–N binary row setup inputs coupled to one row of said recursive elements are at the other of the first and second binary states.

8. The apparatus according to claim 1, wherein all of the predetermined binary row inputs are one of the first and second binary values and all of the predetermined binary column inputs are the other of the first and second binary values.

9. The apparatus according to claim 1, wherein all of the predetermined binary row inputs are one of the first and second binary values and all of the predetermined binary column inputs are the other of the first and second binary values.

10. An apparatus for making a comparison of the number of bits having a first binary value within a binary word of M bits to a predetermined number (N), wherein each of the bits of the binary word has a first or a second binary value, and wherein M is a positive non-zero integer and N is an integer greater than or equal to zero and less than M−1, the apparatus being a logic circuit comprising:

(N+1)*(M−N−1) first recursive elements and (N+1) second recursive elements interconnected in a matrix, the matrix being an arrangement of said first recursive elements and second recursive elements in rows, columns, and diagonals;

M data inputs for coupling the M bits of the binary word to said first recursive elements and said second recursive elements;

M inverted data inputs for coupling inverted values of the M bits of the binary word to said first recursive elements and said second recursive elements;

M–N first binary values coupled to said recursive elements of one row of said first and second recursive elements; and a logic circuit output comprising an output of one of said first recursive elements, the output having a binary value determined by a comparison of the number of bits having a first binary value within the binary word, to the predetermined number (N).

11. The apparatus according to claim 10, wherein:

the matrix is an arrangement of said first and second recursive elements organized in N+1 rows, M–N columns, and M diagonals of said recursive elements, each row is identified by a row number i, i being an integer from 1 to N+1, each column being identified by a column number j, j being an integer from 1 to M–N, and each diagonal being identified by a diagonal number k, k being an integer from 1 to M, and each of said first and second recursive elements is identified by a unique one of (N+1)*(M–N) row and column couplets (i,j), and is further identified by the diagonal number k, k=i+j−1, and wherein:

a first input of each of the first recursive elements (i,j), i=1 to N+1 and j=3 to M–N, is coupled to an output of the first recursive element (i,j−1);

a first input of each of the first recursive elements (i,2), i=1 to N+1, is coupled to an output of the second recursive element (i,1);

a second input of each of the first recursive elements (i,j), i=2 to N+1 and j=2 to M–N, is coupled to an output of the first recursive element (i−1,j);

a second input of each of the second recursive elements (i,1), i=2 to N+1, is coupled to an output of the second recursive element (i−1,1);

a second input of each of the first recursive elements (1,j), j=2 to M–N, is coupled to a first binary value; and a second input of the second recursive element (1,1) is coupled to a first binary value.

12. The apparatus according to claim 11, wherein:

each of said M data inputs couples the value of a unique one of the M bits of the binary word to fourth inputs of the first and second recursive elements identified by a unique one of the M diagonal numbers (k);

each of said M inverted data inputs couples the inverted value of a unique one of the bits of the binary word to third inputs of the first recursive elements identified by a unique one of the M diagonal numbers (k); and the output of first recursive element (N+1,M−N) comprises said logic circuit output.

13. The apparatus according to claim 11 wherein said first recursive element includes two metal oxide semiconductor field effect (MOSFET) transistors and said second recursive element includes one MOSFET transistor.

14. The apparatus according to claim 13 each MOSFET has a gate, a source, and a drain, and wherein:

the drain electrodes of the two MOSFETs in said first recursive element are coupled together, forming the output of said first recursive element;

the first input of said first recursive element is the source electrode of a first MOSFET;

the second input of said first recursive element is the source electrode of a second MOSFET;

the third input of said first recursive element is the gate electrode of said first MOSFET;

the fourth input of said first recursive element is the gate electrode of the second MOSFET;

the output of said second recursive element is the drain electrode of the MOSFET;

the second input of said second recursive element is the source electrode of the MOSFET; and the fourth input of said second recursive element is the gate electrode of the MOSFET.

15. The apparatus according to claim 11 wherein each of the first recursive elements consists of three dual input complementary metal oxide semiconductor field effect transistor (CMOS) NAND gates, and each of the second recursive elements consists of one dual input CMOS NAND gate and one CMOS INVERTER.

16. The apparatus according to claim 10, wherein the M–N binary row setup inputs coupled to one row of said recursive elements are at the one of the first and second binary states.

17. An apparatus for making a comparison of the number of bits having a first binary value within a binary word of M bits to a predetermined number (N), wherein each of the M bits has a first or a second binary value, and wherein M is greater than 2 and N is a positive non-zero integer less than or equal to M−1, the apparatus being a logic circuit comprising:

a coupling of (N+1)*(M−1)−(N*(N+1)/2) recursive elements interconnected in a matrix, the matrix being an arrangement of said recursive elements in rows, and columns;

M data inputs for coupling the M bits of the binary word to (N)*(M−1)−((N−1)*N/2) of said recursive elements; and a first logic circuit output comprising a first output of one of said recursive elements, the first logic circuit output having a binary value determined by a comparison of the number of bits having a first binary value within the binary word, to the predetermined number (N), wherein the matrix is an arrangement of said recursive elements organized in N+1rows, and M−1 columns of said recursive elements, each row is identified by a row number i, i being an integer from 1 N+1, and each column being identified by a column number j, j being an integer from 1 to M−1, and each of said recursive elements is identified by a unique one of (N+1)*(M−1)−(N*((N+1)/2) row and column couplets (i,j), and wherein:

a first input of each of the recursive elements (i,j), i=2 to N+1 and j=i to M−1, is coupled to a second output of the recursive element (i−1,j);

a second input of each of the recursive elements (i,j),i=1 to N+1 and j=i+1 to M−1, is coupled to a first output of the recursive element (i,j−1);

a second input of each of the recursive elements (i,j), i=2 to N+1 and j=i, is coupled to a second output of the recursive element (i−1,j−1); and wherein each of said recursive elements includes two two-input logic gates.

18. The apparatus according to claim 17, wherein:

each of M−1 of said data inputs couples the value of a unique one of the M bits of the binary word to third inputs of the recursive elements (i,j) in a column j, i=1 to j for j=1 to N−1 and i=1 to N for j=N to M−1, and further couples the value of each unique one of the M bits of the binary word to a first input of the recursive element (1,j) in the column j, for j=1 to M−1;

one of said data inputs couples the value of one of the M bits of the binary word, being none of the M bits of the binary word coupled to the M—1 of said data inputs, to a second input of the recursive element (1,1); and the output of the recursive element (N+1,M−1) comprises said first logic circuit output.

19. The apparatus according to claim 17 wherein the outputs of the recursive elements (i,M−1), i=1 to N, comprise N additional logic circuit outputs, each identified as output (i), the binary value of the logic circuit output (i) being determined by a comparison of the number of bits having a first binary value within the binary word, to the number (i).

20. The apparatus according to claim 17 wherein each of said recursive elements includes an AND gate having two inputs and an output, and an OR gate having two inputs and an output.

21. The apparatus according to claim 20 wherein:

the first output of each of said recursive elements is the output of the OR gate;

the second output of each of said recursive elements is the output of the AND gate;

the first input of each of said recursive elements is a first input of the OR gate;

the second input of each of said recursive elements is coupled to a first input of the AND gate and to a second input of the OR gate; and the third input of each of said recursive elements is a second input of the AND gate.

22. An apparatus for making a comparison of the number of bits having a first binary value within a binary word of M bits to a predetermined number (N), wherein each of the M bits has a first or a second binary value, and wherein M is greater than 2 and N is a positive non-zero integer less than or equal to M−1, the apparatus being a logic circuit comprising:

a coupling of N*(M−1)−((N+1)*N/2) first recursive elements and M−N−1 second recursive elements interconnected in a matrix, the matrix being an arrangement of said first and second recursive elements in rows, and columns;

M data inputs for coupling the M bits of the binary word to said first recursive elements; and a first logic circuit output comprising a first output of one of said second recursive elements, the first logic circuit output having a binary value determined by a comparison of the number of bits having a first binary value within the binary word, to the predetermined number (N), wherein:

the matrix is an arrangement of said recursive elements organized in N+1 rows, and M−1 columns of said recursive elements.

each row is identified by a row number i, i being an integer from i to N+1, and each column being identified by a column number j, j being an integer from 1 to M−1, and each of said first recursive elements and second recursive elements is identified by a unique one of (N+1)*(M−1)−(N*((N+1)/2) row and column couplets (i,j), and wherein:

a first input of each of the first recursive elements (i,j), i=2 to N and j=i to M−i, is coupled to a second output of the first recursive element (i−1,j);

a second input of each of the first recursive elements (i,j), i=1 to N and j=i+1 to M−1, is coupled to a first output of the first recursive element (i,j−1);

a second input of each of the first recursive elements (i,j), i=2 to N and j=i, is coupled to a second output of the first recursive element (i−1,j−1);

a first input of each of the second recursive elements (N+1,j), j=N+1 to M−1, is coupled to a second output of the first recursive element (i−1,j);

a second input of each of the second recursive elements (N+1,j), j=N+2 to M−1, is coupled to a first output of the second recursive element (N+1,j−1);

a second input of each of the second recursive elements (N+1,N+1) is coupled to a second output of the first recursive element (N,N); and wherein each of said first recursive elements includes two two-input logic gates and each of said second recursive elements includes of one two-input logic gate; and wherein outputs of the recursive elements (i,M−1), i=1 to N, comprise N additional logic circuit outputs, each identified as output (i), the binary value of the logic circuit output (i) being determined by a comparison of the number of bits having a first binary value within the binary word, to the number (i).

23. The apparatus according to claim 22, wherein:

each of M−1 of said M data inputs couples the value of a unique one of the M bits of the binary word to third inputs of the first recursive elements (i,j), i=1 to j for j=1 to N−1 and i=1 to N for j=N to M−1, and further couples the value of the unique one of the bits of the binary word to a first input of the first recursive element (1,j); and one of said M data inputs, being none of the M−1 of said M data inputs, couples the value of a unique one of the bits of the binary word to a second input of the first recursive element (1,1);

the output of the second recursive element (N+1,M−N) comprises said first logic circuit output.

24. The logic circuit according to claim 22 wherein each of said first recursive elements includes an AND gate having two inputs and an output and an OR gate having two inputs and an output, and each of said second recursive elements includes an OR gate having two inputs and an output.

25. The logic circuit according to claim 24 wherein:

the first output of each of said first recursive elements is the output of the OR gate;

the second output of each of said first recursive elements is the output of the AND gate;

the first input of each of said first recursive elements is a first input of the OR gate;

the second input of each of said first recursive elements is coupled to a first input of the AND gate and to a second input of the OR gate;

the third input of each of said first recursive elements is a second input of the AND gate;

the first output of each of said second recursive elements is the output of the OR gate;

the first input of each of said second recursive elements is a first input of the OR gate; and the second input of each of said second recursive elements is a second input of the OR gate.

26. A communication receiver comprising:

a receiver for recovering a signal having data words and message information, the receiver generating data words having bits;

a controller coupled to said receiver for controlling the communication receiver and for storing a reference word having M bits;

correlation means coupled to said receiver for accepting the data words, and coupled to said controller for accepting the reference word, said correlation means comprising:

comparison means for comparing the bits of the data words coupled from said receiver to the bits of the reference word coupled from said controller, generating a comparison word comprising M bits representing the results of the comparison, wherein a first quantity of said M bits of said comparison word having a first binary value represent a mismatch; and weight detector means for making a comparison of the first quantity of said M bits to a predetermined number, N, and wherein M is a positive non-zero integer and N is an integer greater than or equal to zero and less than or equal to M−1, the weight detector being a logic circuit comprising:

(N+1)*(M−N) recursive elements interconnected in a matrix, the matrix being an arrangement of said recursive elements in rows, columns, and diagonals;

M data inputs for coupling the M bits of the comparison word to said recursive elements;

M inverted data inputs for coupling inverted values of the M bits of the comparison word to said recursive elements;

N+1 binary column setup inputs coupled to one column of said recursive elements;

M−N binary row setup inputs coupled to one row of said recursive elements; and a correlation output being an output of one of said recursive elements, the correlation output having a binary value determined by a comparison of the first quantity of said M bits to the predetermined number, N, the comparison being determined by the values of the binary row and column setup inputs;

said controller further coupled to said correlation means for processing the message coupled from said receiver and for generating an alert activation command in response to the correlation output; and an alert device coupled to said controller for presenting an alert signal in response to the alert activation command.

27. A communication receiver comprising:

a receiver for recovering a signal having data words and message information, the receiver generating data words having bits;

a controller coupled to said receiver for controlling the communication receiver and for storing a reference word having M bits;

correlation means coupled to said receiver for accepting the data words, and coupled to said controller for accepting the reference word, said correlation means comprising:

comparison means for comparing the bits of the data words coupled from said receiver to the bits of the reference word coupled from said controller, generating a comparison word comprising M bits representing the results of the comparison, wherein a first quantity of said M bits of the comparison word having a first binary value represent a mismatch; and weight detector means for making a comparison of the first quantity of said M bits to a predetermined number, N, and wherein M is greater than 2 and N is a positive non-zero integer less than or equal to M−1, the apparatus being a logic circuit comprising:

a coupling of $N*(M-1)-((N+1)*N/2)$ first recursive elements and M−N−1 second recursive elements interconnected in a matrix, the matrix being an arrangement of said first and second recursive elements in rows, and columns;

M data inputs for coupling the M bits of the comparison word to said first recursive elements; and a correlation output comprising a first output of one of said first and second recursive elements, the correlation output having a binary value determined by a comparison of the first quantity of said M bits to the predetermined number (N);

said controller further coupled to said correlation means for processing the message coupled from said receiver and for generating an alert activation command in response to the correlation output; and an alert device coupled to said controller for presenting an alert signal in response to the alert activation command.

* * * * *

UNITED STATES PATENT AND TRADEMARK OFFICE
CERTIFICATE OF CORRECTION

PATENT NO. : 5,623,519
DATED : April 22, 1997
INVENTOR(S) : Babcock et al.

It is certified that error appears in the above-indentified patent and that said Letters Patent is hereby corrected as shown below:

Column 21, line 17, delete "N+1rows" and insert --N+1 rows--.
Column 21, line 20, after integer from 1, insert --to--.

Signed and Sealed this

Twenty-fifth Day of April, 2000

Attest:

Q. TODD DICKINSON

*Attesting Officer*  *Director of Patents and Trademarks*